United States Patent
Zadesky et al.

(10) Patent No.: US 10,353,565 B2
(45) Date of Patent: Jul. 16, 2019

(54) INPUT APPARATUS AND BUTTON ARRANGEMENT FOR HANDHELD DEVICE

(71) Applicant: Apple Inc., Cupertino, CA (US)

(72) Inventors: Stephen Paul Zadesky, Portola Valley, CA (US); Tang Yew Tan, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/011,517

(22) Filed: Jun. 18, 2018

(65) Prior Publication Data
US 2018/0307392 A1   Oct. 25, 2018

Related U.S. Application Data

(63) Continuation of application No. 11/882,004, filed on Jul. 30, 2007, now abandoned, which is a
(Continued)

(51) Int. Cl.
*G06F 3/0484* (2013.01)
*G06F 3/0485* (2013.01)
(Continued)

(52) U.S. Cl.
CPC ............ *G06F 3/0485* (2013.01); *G06F 1/169* (2013.01); *G06F 1/1626* (2013.01); *G06F 3/038* (2013.01); *G06F 3/03547* (2013.01)

(58) Field of Classification Search
CPC ...... G06F 3/0485; G06F 1/169; G06F 1/1626; G06F 3/03547; G06F 3/038
(Continued)

(56) References Cited

U.S. PATENT DOCUMENTS 1,061,578 A   5/1913   Wischhusen et al.
2,063,276 A   12/1936  Thomas
(Continued)

FOREIGN PATENT DOCUMENTS

CA   1243096     10/1988
CA   2 597 500   8/2006
(Continued)

OTHER PUBLICATIONS

"About Quicktip®" www.logicad3d.com-docs-qt.html, downloaded Apr. 8, 2002.
(Continued)

*Primary Examiner* — Rodney Amadiz
(74) *Attorney, Agent, or Firm* — Kubota & Basol LLP

(57) ABSTRACT

A media device for storing and playing media such as audio, video or images, includes a memory device configured to store a plurality of media items in a digital format. The media device also includes a display configured to present a group of media items from the plurality of stored media items and to present a visual indicator that is capable of scrolling through the displayed group of media items in order to designate a specific media item from the group of media items. The media device further includes a touch pad configured to receive input from a sliding motion or a tapping motion of a finger. The sliding motion of the finger controls the movement of the visual indicator through the group of media items. The tapping motion of the finger selects the specific media item that is designated by the visual indicator.

16 Claims, 7 Drawing Sheets

Related U.S. Application Data continuation of application No. 11/806,957, filed on Jun. 5, 2007, now Pat. No. 7,333,092, which is a continuation of application No. 11/386,238, filed on Mar. 21, 2006, now Pat. No. 7,348,967, which is a continuation of application No. 10/188,182, filed on Jul. 1, 2002, now Pat. No. 7,046,230.

(60) Provisional application No. 60/359,551, filed on Feb. 25, 2002.

(51) Int. Cl.
   G06F 1/16 (2006.01)
   G06F 3/0354 (2013.01)
   G06F 3/038 (2013.01)

(58) Field of Classification Search
   USPC .................................................. 345/156–178
   See application file for complete search history.

(56) References Cited

U.S. PATENT DOCUMENTS

| | | |
|---|---|---|
| 2,794,861 A | 6/1957 | Heine |
| 2,798,907 A | 7/1957 | Schneider |
| 2,903,229 A | 9/1959 | Landge |
| 2,945,111 A | 7/1960 | McCormick |
| 3,005,055 A | 10/1961 | Mattke |
| 3,965,399 A | 6/1976 | Walker et al. |
| 3,996,441 A | 12/1976 | Ohashi |
| 4,029,915 A | 6/1977 | Ojima |
| 4,103,252 A | 7/1978 | Bobick |
| 4,110,749 A | 8/1978 | Janko et al. |
| 4,115,670 A | 9/1978 | Chandler |
| 4,121,204 A | 10/1978 | Welch et al. |
| 4,129,747 A | 12/1978 | Pepper |
| 4,158,216 A | 6/1979 | Bigelow |
| 4,242,676 A | 12/1980 | Piguet et al. |
| 4,246,452 A | 1/1981 | Chandler |
| 4,264,903 A | 4/1981 | Bigelow |
| 4,266,144 A | 5/1981 | Bristol |
| 4,293,734 A | 10/1981 | Peper, Jr. |
| D264,969 S | 6/1982 | McGoutry |
| 4,338,502 A | 7/1982 | Hashimoto et al. |
| 4,380,007 A | 4/1983 | Steinegger |
| 4,380,040 A | 4/1983 | Posset |
| 4,394,649 A | 7/1983 | Suchoff et al. |
| 4,475,008 A | 10/1984 | Doi et al. |
| 4,570,149 A | 2/1986 | Thornburg et al. |
| 4,583,161 A | 4/1986 | Gunderson et al. |
| 4,587,378 A | 5/1986 | Moore |
| 4,604,786 A | 8/1986 | Howie, Jr. |
| 4,613,736 A | 9/1986 | Shichijo et al. |
| 4,644,100 A | 2/1987 | Brenner et al. |
| 4,719,524 A | 1/1988 | Morishima et al. |
| 4,734,034 A | 3/1988 | Maness et al. |
| 4,736,191 A | 4/1988 | Matzke et al. |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,771,139 A | 9/1988 | DeSmet |
| 4,798,919 A | 1/1989 | Miessler et al. |
| 4,810,992 A | 3/1989 | Eventoff |
| 4,822,957 A | 4/1989 | Talmage, Jr. et al. |
| 4,831,359 A | 5/1989 | Newell |
| 4,849,852 A | 7/1989 | Mullins |
| 4,856,993 A | 8/1989 | Maness et al. |
| 4,860,768 A | 8/1989 | Hon et al. |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,943,889 A | 7/1990 | Ohmatoi |
| 4,951,036 A | 8/1990 | Grueter et al. |
| 4,954,823 A | 9/1990 | Binstead |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,086,870 A | 2/1992 | Bolduc |
| 5,088,070 A | 2/1992 | Shiff |
| 5,107,082 A | 4/1992 | Valenzona |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,193,669 A | 3/1993 | Demeo et al. |
| 5,225,959 A | 7/1993 | Stearns |
| 5,231,326 A | 7/1993 | Echols |
| 5,237,311 A | 8/1993 | Mailey et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,379,057 A | 1/1995 | Clough et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,434,757 A | 7/1995 | Kashiwagi |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,481,278 A | 1/1996 | Shigematsu et al. |
| 5,483,261 A | 1/1996 | Yasutake |
| 5,483,454 A | 1/1996 | Lewiner et al. |
| 5,488,204 A | 1/1996 | Mead et al. |
| 5,494,157 A | 2/1996 | Golenz et al. |
| 5,495,077 A | 2/1996 | Miller et al. |
| 5,495,566 A | 2/1996 | Kwatinetz |
| 5,508,703 A | 4/1996 | Okamura et al. |
| 5,508,717 A | 4/1996 | Miller |
| 5,541,372 A | 7/1996 | Baller et al. |
| 5,543,588 A | 8/1996 | Bisset et al. |
| 5,543,591 A | 8/1996 | Gillespie et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,563,632 A | 10/1996 | Roberts |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,856 A | 12/1996 | Stein et al. |
| 5,589,893 A | 12/1996 | Gaughan et al. |
| 5,591,945 A | 1/1997 | Kent |
| 5,596,347 A | 1/1997 | Robertson et al. |
| 5,596,697 A | 1/1997 | Foster et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |

(56) References Cited

U.S. PATENT DOCUMENTS

| | | |
|---|---|---|
| 5,657,012 A | 8/1997 | Tait |
| 5,661,632 A | 8/1997 | Register |
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,748,512 A | 5/1998 | Vargas |
| 5,751,274 A | 5/1998 | Davis |
| 5,754,890 A | 5/1998 | Holmdahl et al. |
| 5,764,066 A | 6/1998 | Novak et al. |
| 5,764,218 A | 6/1998 | Della Bona et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A | 8/1998 | Buxton et al. |
| 5,801,941 A | 9/1998 | Betram et al. |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Teres |
| 5,815,141 A | 9/1998 | Phares |
| 5,821,922 A | 10/1998 | Sellers |
| 5,825,351 A | 10/1998 | Tam |
| 5,825,352 A | 10/1998 | Bisset et al. |
| 5,825,353 A | 10/1998 | Will |
| 5,828,364 A | 10/1998 | Siddiqui |
| 5,835,079 A | 11/1998 | Shieh |
| 5,838,304 A | 11/1998 | Hall |
| 5,841,078 A | 11/1998 | Miller et al. |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,645 A | 1/1999 | Norton |
| 5,856,822 A | 1/1999 | Du et al. |
| 5,859,629 A | 1/1999 | Tognazzini |
| 5,861,875 A | 1/1999 | Gerpheide |
| 5,864,334 A | 1/1999 | Sellers |
| 5,867,914 A | 2/1999 | Watson et al. |
| 5,869,791 A | 2/1999 | Young |
| 5,875,311 A | 2/1999 | Bertram et al. |
| 5,880,411 A | 3/1999 | Gillespie et al. |
| 5,883,612 A | 3/1999 | Kreitzer |
| 5,883,619 A | 3/1999 | Ho et al. |
| 5,889,236 A | 3/1999 | Gillespie et al. |
| 5,889,511 A | 3/1999 | Ong et al. |
| 5,890,181 A | 3/1999 | Selesky et al. |
| 5,894,117 A | 4/1999 | Kamishima |
| 5,903,229 A | 5/1999 | Kishi |
| 5,907,152 A | 5/1999 | Dandiliker et al. |
| 5,907,318 A | 5/1999 | Medina |
| 5,909,211 A | 6/1999 | Combs et al. |
| 5,910,802 A | 6/1999 | Shields et al. |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,933,141 A | 8/1999 | Smith |
| 5,936,619 A | 8/1999 | Nagasaki et al. |
| 5,943,044 A | 8/1999 | Martinelli et al. |
| 5,943,052 A | 8/1999 | Allen et al. |
| 5,953,000 A | 9/1999 | Weirich |
| 5,956,019 A | 9/1999 | Bang et al. |
| 5,959,610 A | 9/1999 | Silfvast |
| 5,959,611 A | 9/1999 | Smailagic et al. |
| 5,963,671 A | 10/1999 | Comerford et al. |
| 5,964,661 A | 10/1999 | Dodge |
| 5,973,668 A | 10/1999 | Watanabe |
| 6,000,000 A | 12/1999 | Hawkins et al. |
| 6,002,093 A | 12/1999 | Hrehor et al. |
| 6,002,389 A | 12/1999 | Kasser et al. |
| 6,005,299 A | 12/1999 | Hengst |
| 6,011,542 A | 1/2000 | Durrani et al. |
| 6,025,832 A | 2/2000 | Sudo et al. |
| 6,031,518 A | 2/2000 | Adams et al. |
| 6,034,672 A | 3/2000 | Gaultiet et al. |
| 6,040,829 A | 3/2000 | Croy et al. |
| 6,075,533 A | 6/2000 | Chang |
| 6,084,574 A | 7/2000 | Bidiville |
| D430,169 S | 8/2000 | Scibora |
| 6,057,829 A | 8/2000 | Silfvast |
| 6,097,372 A | 8/2000 | Suzuki |
| 6,104,790 A | 8/2000 | Narayanaswami |
| 6,118,435 A | 9/2000 | Fujita et al. |
| 6,122,526 A | 9/2000 | Parulski et al. |
| 6,124,587 A | 9/2000 | Bidiville et al. |
| 6,128,006 A | 10/2000 | Rosenberg et al. |
| 6,131,048 A | 10/2000 | Sudo et al. |
| 6,141,068 A | 10/2000 | Iijima |
| 6,147,856 A | 11/2000 | Karidis |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,185,591 B1 | 2/2001 | Baker et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,216,988 B1 | 4/2001 | Hsu et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| D443,616 S | 6/2001 | Fisher et al. |
| 6,243,078 B1 | 6/2001 | Rosenberg |
| 6,243,080 B1 | 6/2001 | Molne |
| 6,243,646 B1 | 6/2001 | Ozaki et al. |
| 6,246,395 B1 | 6/2001 | Goyins et al. |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| 6,285,211 B1 | 9/2001 | Sample et al. |
| D448,810 S | 10/2001 | Goto |
| 6,297,795 B1 | 10/2001 | Kato et al. |
| 6,297,811 B1 | 10/2001 | Kent et al. |
| 6,300,946 B1 | 10/2001 | Lincke et al. |
| 6,307,539 B2 | 10/2001 | Suzuki |
| 6,310,610 B1 | 10/2001 | Beaton et al. |
| D450,713 S | 11/2001 | Masamitsu et al. |
| 6,314,483 B1 | 11/2001 | Goto et al. |
| 6,321,441 B1 | 11/2001 | Davidson et al. |
| 6,323,843 B2 | 11/2001 | Giles et al. |
| 6,323,845 B1 | 11/2001 | Robbins |
| 6,323,846 B1 | 11/2001 | Westerman et al. |
| D452,250 S | 12/2001 | Chan |
| 6,330,244 B1 | 12/2001 | Swartz et al. |
| 6,336,614 B1 | 1/2002 | Kwitek |
| 6,337,678 B1 | 1/2002 | Fish |
| 6,340,800 B1 | 1/2002 | Zhai et al. |
| 6,344,619 B1 | 2/2002 | Yamasaki et al. |
| D454,568 S | 3/2002 | Andre et al. |
| 6,357,887 B1 | 3/2002 | Novak |
| 6,359,572 B1 | 3/2002 | Vale |
| D455,793 S | 4/2002 | Lin |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,407,325 B2 | 6/2002 | Yi et al. |
| 6,424,338 B1 | 7/2002 | Anderson |

(56) References Cited

U.S. PATENT DOCUMENTS

| | | |
|---|---|---|
| 6,429,846 B2 | 8/2002 | Rosenberg et al. |
| 6,429,852 B1 | 8/2002 | Adams et al. |
| 6,437,836 B1 | 8/2002 | Huang et al. |
| 6,452,514 B1 | 9/2002 | Philipp |
| 6,462,941 B1 | 10/2002 | Hulick et al. |
| 6,465,271 B1 | 10/2002 | Ko et al. |
| 6,473,069 B1 | 10/2002 | Gerphelde |
| 6,492,602 B2 | 12/2002 | Asai et al. |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,546,231 B1 | 4/2003 | Someya et al. |
| 6,556,222 B1 | 4/2003 | Narayanaswami |
| 6,563,487 B2 | 5/2003 | Martin et al. |
| 6,570,583 B1 | 5/2003 | Kung et al. |
| 6,573,844 B1 | 6/2003 | Venolia et al. |
| 6,587,091 B2 | 7/2003 | Serpa |
| 6,597,345 B2 | 7/2003 | Hirshberg |
| 6,600,481 B1 | 7/2003 | Brown et al. |
| 6,606,244 B1 | 8/2003 | Liu et al. |
| 6,610,936 B2 | 8/2003 | Gillespie et al. |
| 6,611,253 B1 | 8/2003 | Cohen |
| 6,618,909 B1 | 9/2003 | Yang |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| 6,654,001 B1 | 11/2003 | Su |
| D483,809 S | 12/2003 | Lim |
| 6,657,560 B1 | 12/2003 | Jung |
| 6,658,773 B2 | 12/2003 | Rohne et al. |
| 6,661,438 B1 | 12/2003 | Shiraishi et al. |
| 6,664,951 B1 | 12/2003 | Fujii et al. |
| 6,674,439 B1 | 1/2004 | Shin et al. |
| 6,677,927 B1 | 1/2004 | Bruck et al. |
| 6,678,215 B1 | 1/2004 | Treyz et al. |
| 6,678,891 B1 | 1/2004 | Wilcox et al. |
| 6,683,649 B1 | 1/2004 | Anderson |
| 6,684,110 B1 | 1/2004 | Kutsuna et al. |
| 6,686,904 B1 | 2/2004 | Sherman et al. |
| 6,686,906 B2 | 2/2004 | Salminen et al. |
| 6,690,387 B2 | 2/2004 | Zimmerman et al. |
| 6,703,550 B2 | 3/2004 | Chu |
| 6,710,771 B1 | 3/2004 | Yamaguchi et al. |
| 6,724,817 B1 | 4/2004 | Simpson et al. |
| 6,727,889 B2 | 4/2004 | Shaw |
| D489,731 S | 5/2004 | Huang |
| 6,738,045 B2 | 5/2004 | Hinckley et al. |
| 6,747,636 B2 | 6/2004 | Martin |
| 6,750,803 B2 | 6/2004 | Yates et al. |
| 6,756,971 B1 | 6/2004 | Ramey et al. |
| 6,760,012 B1 | 7/2004 | Laurila |
| 6,765,557 B1 | 7/2004 | Segal et al. |
| 6,781,576 B2 | 8/2004 | Tamura |
| 6,784,384 B2 | 8/2004 | Park et al. |
| 6,788,288 B2 | 9/2004 | Ano |
| 6,791,533 B2 | 9/2004 | Su |
| 6,795,057 B2 | 9/2004 | Gordon |
| D497,618 S | 10/2004 | Andre et al. |
| 6,810,271 B1 | 10/2004 | Wood et al. |
| 6,819,312 B2 | 11/2004 | Fish |
| 6,822,640 B2 | 11/2004 | Derocher |
| 6,834,975 B2 | 12/2004 | Chu-Chia et al. |
| 6,844,872 B1 | 1/2005 | Farag et al. |
| 6,855,899 B2 | 2/2005 | Sotome |
| 6,865,718 B2 | 3/2005 | Levi Montalcini |
| 6,867,965 B2 | 3/2005 | Khoo |
| 6,930,494 B2 | 3/2005 | Tesdahl et al. |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,933,732 B2 | 8/2005 | Morimoto |
| 6,943,705 B1 | 9/2005 | Bolender et al. |
| 6,943,779 B2 | 9/2005 | Satoh |
| 6,958,614 B2 | 10/2005 | Morimoto |
| 6,977,808 B2 | 12/2005 | Lam et al. |
| 6,978,127 B1 | 12/2005 | Bulthuis et al. |
| 6,982,695 B1 | 1/2006 | Canova et al. |
| 6,985,137 B2 | 1/2006 | Kaikuranta |
| 7,006,077 B1 | 2/2006 | Uusimäki |
| 7,015,894 B2 | 3/2006 | Morohoshi |
| 7,019,225 B2 | 3/2006 | Matsumoto et al. |
| 7,036,946 B1 | 5/2006 | Mosier |
| 7,038,659 B2 | 5/2006 | Rajkowski |
| 7,046,230 B2 | 5/2006 | Zadesky et al. |
| 7,050,292 B2 | 5/2006 | Shimura et al. |
| 7,069,044 B2 | 6/2006 | Okada et al. |
| 7,078,633 B2 | 7/2006 | Ihalainen |
| 7,084,856 B2 | 8/2006 | Huppi |
| 7,088,347 B2 | 8/2006 | Iisaka et al. |
| 7,107,147 B2 | 9/2006 | Pascual et al. |
| 7,111,788 B2 | 9/2006 | Reponen |
| 7,113,196 B2 | 9/2006 | Kerr |
| 7,113,520 B1 | 9/2006 | Meenan |
| 7,117,136 B1 | 10/2006 | Rosedale |
| 7,119,792 B1 | 10/2006 | Andre et al. |
| 7,149,550 B2 | 12/2006 | Kraft et al. |
| 7,184,064 B2 | 2/2007 | Zimmerman et al. |
| 7,215,319 B2 | 5/2007 | Kamijo et al. |
| 7,218,956 B2 | 5/2007 | Okawa |
| 7,233,318 B1 | 6/2007 | Farag et al. |
| 7,236,154 B1 | 6/2007 | Kerr et al. |
| 7,236,159 B1 | 6/2007 | Siversson |
| 7,253,643 B1 | 8/2007 | Seguine |
| 7,279,647 B2 | 10/2007 | Philipp |
| 7,286,115 B2 | 10/2007 | Longe et al. |
| 7,288,732 B2 | 10/2007 | Hashida |
| 7,297,883 B2 | 11/2007 | Rochon et al. |
| 7,310,089 B2 | 12/2007 | Baker et al. |
| 7,312,785 B2 | 12/2007 | Tsuk et al. |
| 7,321,103 B2 | 1/2008 | Nakanishi et al. |
| 7,333,092 B2 | 2/2008 | Zadesky et al. |
| 7,345,670 B2 | 3/2008 | Armstrong |
| 7,348,898 B2 | 3/2008 | Ono |
| 7,382,139 B2 | 6/2008 | Mackey |
| 7,394,038 B2 | 7/2008 | Chang |
| 7,395,081 B2 | 7/2008 | Bonnelykke Kristensen et al. |
| 7,397,467 B2 | 7/2008 | Park et al. |
| 7,439,963 B2 | 10/2008 | Geaghan et al. |
| 7,466,307 B2 | 12/2008 | Trent et al. |
| 7,479,949 B2 | 1/2009 | Jobs et al. |
| 7,486,323 B2 | 2/2009 | Lee et al. |
| 7,499,040 B2 | 3/2009 | Zadesky et al. |
| 7,502,016 B2 | 3/2009 | Trent, Jr. et al. |
| 7,503,193 B2 | 3/2009 | Schoene et al. |
| 7,593,782 B2 | 9/2009 | Jobs et al. |
| 7,616,097 B1 | 11/2009 | Whang |
| 7,633,076 B2 | 12/2009 | Huppi et al. |
| 7,645,955 B2 | 1/2010 | Huang et al. |
| 7,663,607 B2 | 2/2010 | Hotelling et al. |
| 7,671,837 B2 | 3/2010 | Forsblad et al. |
| 7,708,051 B2 | 5/2010 | Katsumi et al. |
| 7,746,323 B2 | 6/2010 | Otsuki et al. |
| 7,764,272 B1 | 7/2010 | Clifton-Bligh |
| 7,772,507 B2 | 8/2010 | Orr et al. |
| 7,852,199 B2 | 12/2010 | Desai et al. |
| 7,932,893 B1 | 4/2011 | Berthaud |
| 8,001,488 B2 | 8/2011 | Lam |
| 8,022,935 B2 | 9/2011 | Hotelling |
| 8,044,314 B2 | 10/2011 | Weber et al. |
| 8,072,439 B2 | 12/2011 | Hillis et al. |
| 8,125,453 B2 | 2/2012 | Shaholan et al. |
| 8,174,508 B2 | 5/2012 | Sinclair et al. |
| 8,471,811 B2 | 6/2013 | Harley |
| 8,479,122 B2 | 7/2013 | Hotelling et al. |
| 8,645,827 B2 | 2/2014 | Beaver et al. |
| 8,749,493 B2 | 6/2014 | Zadesky et al. |
| 9,367,151 B2 | 6/2016 | Mckillop |
| 10,139,870 B2 | 11/2018 | Hotelling |
| 10,180,732 B2 | 1/2019 | Prest et al. |

(56) References Cited

U.S. PATENT DOCUMENTS

| | | |
|---|---|---|
| 2001/0006388 A1 | 7/2001 | Kim et al. |
| 2001/0011991 A1 | 8/2001 | Wang et al. |
| 2001/0011993 A1 | 8/2001 | Saarinen |
| 2001/0033270 A1 | 10/2001 | Osawa et al. |
| 2001/0035854 A1 | 11/2001 | Rosenberg et al. |
| 2001/0043545 A1 | 11/2001 | Aratani |
| 2001/0047926 A1 | 12/2001 | Kozuma |
| 2001/0050673 A1 | 12/2001 | Davenport |
| 2001/0051046 A1 | 12/2001 | Watanabe et al. |
| 2001/0053692 A1 | 12/2001 | Ito et al. |
| 2002/0000978 A1 | 1/2002 | Gerpheide |
| 2002/0002039 A1 | 1/2002 | Qureshey et al. |
| 2002/0002643 A1 | 1/2002 | Yamamoto et al. |
| 2002/0009193 A1 | 1/2002 | Deguchi |
| 2002/0011993 A1 | 1/2002 | Lui et al. |
| 2002/0027547 A1 | 3/2002 | Kamijo |
| 2002/0030665 A1 | 3/2002 | Ano |
| 2002/0033848 A1 | 3/2002 | Sciammarella et al. |
| 2002/0039493 A1 | 4/2002 | Tanaka |
| 2002/0045960 A1 | 4/2002 | Phillips et al. |
| 2002/0071550 A1 | 6/2002 | Pletikosa |
| 2002/0072394 A1 | 6/2002 | Muramatsu |
| 2002/0080123 A1 | 6/2002 | Kennedy et al. |
| 2002/0084721 A1 | 7/2002 | Walczak |
| 2002/0089545 A1 | 7/2002 | Levi Montalcini |
| 2002/0103796 A1 | 8/2002 | Hartley |
| 2002/0118131 A1 | 8/2002 | Yates et al. |
| 2002/0118169 A1 | 8/2002 | Hinckley et al. |
| 2002/0140668 A1 | 10/2002 | Crawford |
| 2002/0145594 A1 | 10/2002 | Derocher |
| 2002/0154090 A1 | 10/2002 | Lin |
| 2002/0158838 A1 | 10/2002 | Smith et al. |
| 2002/0158844 A1 | 10/2002 | McLoone et al. |
| 2002/0164156 A1 | 11/2002 | Bilbrey |
| 2002/0168947 A1 | 11/2002 | Lemley |
| 2002/0180701 A1 | 12/2002 | Hayama et al. |
| 2002/0196234 A1 | 12/2002 | Gray |
| 2002/0196239 A1 | 12/2002 | Lee |
| 2003/0002246 A1 | 1/2003 | Kerr |
| 2003/0025679 A1 | 2/2003 | Taylor et al. |
| 2003/0028346 A1 | 2/2003 | Sinclair et al. |
| 2003/0038776 A1 | 2/2003 | Rosenberg et al. |
| 2003/0038824 A1 | 2/2003 | Ryder |
| 2003/0043121 A1 | 3/2003 | Chen |
| 2003/0043174 A1 | 3/2003 | Hinckley et al. |
| 2003/0048262 A1 | 3/2003 | Wu et al. |
| 2003/0050092 A1 | 3/2003 | Yun |
| 2003/0070106 A1 | 4/2003 | Kosuda et al. |
| 2003/0076301 A1 | 4/2003 | Tsuk et al. |
| 2003/0076303 A1 | 4/2003 | Huppi |
| 2003/0080947 A1 | 5/2003 | Genest et al. |
| 2003/0091377 A1 | 5/2003 | Hsu et al. |
| 2003/0095095 A1 | 5/2003 | Pihlaja |
| 2003/0095096 A1 | 5/2003 | Robbin et al. |
| 2003/0098851 A1 | 5/2003 | Brink |
| 2003/0103043 A1 | 6/2003 | Mulligan et al. |
| 2003/0104839 A1 | 6/2003 | Kraft et al. |
| 2003/0122779 A1 | 7/2003 | Martin et al. |
| 2003/0122792 A1 | 7/2003 | Yamamoto et al. |
| 2003/0135292 A1 | 7/2003 | Husgafvel et al. |
| 2003/0142081 A1 | 7/2003 | Iizuka et al. |
| 2003/0142288 A1 | 7/2003 | Kinrot et al. |
| 2003/0162569 A1 | 8/2003 | Arakawa et al. |
| 2003/0184517 A1 | 10/2003 | Senzui et al. |
| 2003/0197740 A1 | 10/2003 | Reponen |
| 2003/0202336 A1 | 10/2003 | Ostergard et al. |
| 2003/0206162 A1 | 11/2003 | Roberts |
| 2003/0206202 A1 | 11/2003 | Moriya |
| 2003/0210537 A1 | 11/2003 | Engelmann |
| 2003/0224831 A1 | 12/2003 | Engstrom et al. |
| 2004/0009788 A1 | 1/2004 | Mantyjarvi et al. |
| 2004/0021643 A1 | 2/2004 | Hoshino et al. |
| 2004/0027341 A1 | 2/2004 | Derocher |
| 2004/0032393 A1 | 2/2004 | Brandenberg et al. |
| 2004/0055446 A1 | 3/2004 | Robbin et al. |
| 2004/0055860 A1 | 3/2004 | Huseman |
| 2004/0061677 A1 | 4/2004 | Litwiller |
| 2004/0062033 A1 | 4/2004 | Chu-Chia et al. |
| 2004/0066405 A1 | 4/2004 | Wessler et al. |
| 2004/0070567 A1 | 4/2004 | Longe et al. |
| 2004/0074756 A1 | 4/2004 | Kawakami et al. |
| 2004/0075676 A1 | 4/2004 | Rosenberg et al. |
| 2004/0080682 A1 | 4/2004 | Dalton |
| 2004/0104894 A1 | 6/2004 | Tsukada et al. |
| 2004/0109357 A1 | 6/2004 | Cernea et al. |
| 2004/0150619 A1 | 8/2004 | Baudisch et al. |
| 2004/0155865 A1 | 8/2004 | Swiader |
| 2004/0156192 A1 | 8/2004 | Kerr et al. |
| 2004/0165924 A1 | 8/2004 | Griffin |
| 2004/0178997 A1 | 9/2004 | Gillespie et al. |
| 2004/0185912 A1 | 9/2004 | Mason et al. |
| 2004/0196268 A1 | 10/2004 | Hsu et al. |
| 2004/0200699 A1 | 10/2004 | Matsumoto et al. |
| 2004/0215986 A1 | 10/2004 | Shakkarwar |
| 2004/0218963 A1 | 11/2004 | Van Diepen et al. |
| 2004/0224638 A1 | 11/2004 | Fadell et al. |
| 2004/0227736 A1 | 11/2004 | Kamrath et al. |
| 2004/0233624 A1 | 11/2004 | Aisenberg |
| 2004/0239622 A1 | 12/2004 | Proctor et al. |
| 2004/0252109 A1 | 12/2004 | Trent, Jr. et al. |
| 2004/0252867 A1 | 12/2004 | Lan et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0007339 A1 | 1/2005 | Sato |
| 2005/0012644 A1 | 1/2005 | Hurst et al. |
| 2005/0017957 A1 | 1/2005 | Yi |
| 2005/0024341 A1 | 2/2005 | Gillespie et al. |
| 2005/0030048 A1 | 2/2005 | Bolender |
| 2005/0042012 A1 | 2/2005 | Ward et al. |
| 2005/0052416 A1 | 3/2005 | Backman et al. |
| 2005/0052425 A1 | 3/2005 | Zadesky et al. |
| 2005/0052426 A1 | 3/2005 | Hagermoser et al. |
| 2005/0052427 A1 | 3/2005 | Wu et al. |
| 2005/0052429 A1 | 3/2005 | Philipp |
| 2005/0068304 A1 | 3/2005 | Lewis et al. |
| 2005/0078093 A1 | 4/2005 | Peterson et al. |
| 2005/0081164 A1 | 4/2005 | Hama et al. |
| 2005/0083299 A1 | 4/2005 | Nagasaka |
| 2005/0083307 A1 | 4/2005 | Aufderheide |
| 2005/0090288 A1 | 4/2005 | Stohr et al. |
| 2005/0104867 A1 | 5/2005 | Westerman et al. |
| 2005/0110768 A1 | 5/2005 | Marriott et al. |
| 2005/0125570 A1 | 6/2005 | Olodort et al. |
| 2005/0129199 A1 | 6/2005 | Abe |
| 2005/0139460 A1 | 6/2005 | Hosaka |
| 2005/0140657 A1 | 6/2005 | Park et al. |
| 2005/0143124 A1 | 6/2005 | Kennedy et al. |
| 2005/0146512 A1 | 7/2005 | Hill et al. |
| 2005/0156881 A1 | 7/2005 | Trent et al. |
| 2005/0156890 A1 | 7/2005 | Wierzoch |
| 2005/0162402 A1 | 7/2005 | Watanachote |
| 2005/0195159 A1 | 9/2005 | Hunleth et al. |
| 2005/0204309 A1 | 9/2005 | Szeto |
| 2005/0237308 A1 | 10/2005 | Autio et al. |
| 2005/0253818 A1 | 11/2005 | Nettamo |
| 2005/0283724 A1 | 12/2005 | Griffin |
| 2006/0007131 A1 | 1/2006 | Lane et al. |
| 2006/0026521 A1 | 2/2006 | Hotelling et al. |
| 2006/0032680 A1 | 2/2006 | Elias et al. |
| 2006/0033701 A1 | 2/2006 | Wilson |
| 2006/0034042 A1 | 2/2006 | Hisano et al. |
| 2006/0038791 A1 | 2/2006 | Mackey |
| 2006/0052885 A1 | 3/2006 | Kong |
| 2006/0060455 A1 | 3/2006 | Mimata et al. |
| 2006/0095848 A1 | 5/2006 | Naik |
| 2006/0097991 A1 | 5/2006 | Hotelling et al. |
| 2006/0097997 A1 | 5/2006 | Borgaonkar et al. |
| 2006/0131156 A1 | 6/2006 | Voelckers |
| 2006/0143574 A1 | 6/2006 | Ito et al. |
| 2006/0174568 A1 | 8/2006 | Kinoshita et al. |
| 2006/0181515 A1 | 8/2006 | Fletcher et al. |
| 2006/0181517 A1 | 8/2006 | Zadesky et al. |
| 2006/0197750 A1 | 9/2006 | Kerr et al. |

(56) References Cited

U.S. PATENT DOCUMENTS

| | | |
|---|---|---|
| 2006/0197753 A1 | 9/2006 | Hotelling |
| 2006/0232557 A1 | 10/2006 | Fallot-Burghardt |
| 2006/0236262 A1 | 10/2006 | Bathiche et al. |
| 2006/0250377 A1 | 11/2006 | Zadesky et al. |
| 2006/0274042 A1 | 12/2006 | Krah et al. |
| 2006/0274905 A1 | 12/2006 | Lindahl et al. |
| 2006/0279896 A1 | 12/2006 | Bruwer |
| 2006/0284836 A1 | 12/2006 | Philipp |
| 2007/0013671 A1 | 1/2007 | Zadesky et al. |
| 2007/0018970 A1 | 1/2007 | Tabasso et al. |
| 2007/0046641 A1 | 3/2007 | Lim |
| 2007/0052044 A1 | 3/2007 | Forsblad et al. |
| 2007/0052691 A1 | 3/2007 | Zadesky et al. |
| 2007/0075965 A1 | 4/2007 | Huppi et al. |
| 2007/0080936 A1 | 4/2007 | Tsuk et al. |
| 2007/0080938 A1 | 4/2007 | Robbin et al. |
| 2007/0080952 A1 | 4/2007 | Lynch et al. |
| 2007/0083822 A1 | 4/2007 | Robbin et al. |
| 2007/0085841 A1 | 4/2007 | Tsuk et al. |
| 2007/0097086 A1 | 5/2007 | Battles et al. |
| 2007/0097089 A1 | 5/2007 | Battles |
| 2007/0106732 A1 | 5/2007 | Weis |
| 2007/0120834 A1 | 5/2007 | Boillot |
| 2007/0126696 A1 | 6/2007 | Boillot |
| 2007/0152975 A1 | 7/2007 | Ogihara |
| 2007/0152977 A1 | 7/2007 | Ng et al. |
| 2007/0152983 A1 | 7/2007 | McKillop et al. |
| 2007/0155434 A1 | 7/2007 | Jobs et al. |
| 2007/0156364 A1 | 7/2007 | Rothkopf |
| 2007/0157089 A1 | 7/2007 | Van Os et al. |
| 2007/0182722 A1 | 8/2007 | Hotelling et al. |
| 2007/0242057 A1 | 10/2007 | Zadesky et al. |
| 2007/0247421 A1 | 10/2007 | Orsley et al. |
| 2007/0247429 A1 | 10/2007 | Westerman |
| 2007/0247443 A1 | 10/2007 | Philipp |
| 2007/0262968 A1 | 11/2007 | Kazuhito et al. |
| 2007/0268275 A1 | 11/2007 | Westerman et al. |
| 2007/0271516 A1 | 11/2007 | Carmichael |
| 2007/0273671 A1 | 11/2007 | Zadesky et al. |
| 2007/0276525 A1 | 11/2007 | Zadesky et al. |
| 2007/0279394 A1 | 12/2007 | Lampell |
| 2007/0285404 A1 | 12/2007 | Rimon et al. |
| 2007/0290990 A1 | 12/2007 | Robbin et al. |
| 2007/0291016 A1 | 12/2007 | Philipp |
| 2007/0296702 A1 | 12/2007 | Strawn et al. |
| 2007/0296709 A1 | 12/2007 | GuangHai |
| 2007/0298231 A1 | 12/2007 | Ito et al. |
| 2008/0006453 A1 | 1/2008 | Hotelling et al. |
| 2008/0006454 A1 | 1/2008 | Hotelling |
| 2008/0007533 A1 | 1/2008 | Hotelling et al. |
| 2008/0007539 A1 | 1/2008 | Hotelling et al. |
| 2008/0012837 A1 | 1/2008 | Marriott et al. |
| 2008/0018616 A1 | 1/2008 | Lampell et al. |
| 2008/0018617 A1 | 1/2008 | Ng et al. |
| 2008/0036473 A1 | 2/2008 | Jansson |
| 2008/0036734 A1 | 2/2008 | Forsblad et al. |
| 2008/0060925 A1 | 3/2008 | Weber et al. |
| 2008/0069412 A1 | 3/2008 | Champagne et al. |
| 2008/0079699 A1 | 4/2008 | Mackey |
| 2008/0087476 A1 | 4/2008 | Prest |
| 2008/0088582 A1 | 4/2008 | Prest |
| 2008/0088596 A1 | 4/2008 | Prest |
| 2008/0088597 A1 | 4/2008 | Prest |
| 2008/0088600 A1 | 4/2008 | Prest |
| 2008/0094352 A1 | 4/2008 | Tsuk et al. |
| 2008/0098330 A1 | 4/2008 | Tsuk et al. |
| 2008/0110739 A1 | 5/2008 | Peng et al. |
| 2008/0111795 A1 | 5/2008 | Bollinger |
| 2008/0136792 A1 | 6/2008 | Peng et al. |
| 2008/0143681 A1 | 6/2008 | XiaoPing |
| 2008/0158145 A1 | 7/2008 | Westerman |
| 2008/0165158 A1 | 7/2008 | Hotelling et al. |
| 2008/0196945 A1 | 8/2008 | Konstas |
| 2008/0202824 A1 | 8/2008 | Philipp et al. |
| 2008/0209442 A1 | 8/2008 | Setlur et al. |
| 2008/0215841 A1 | 9/2008 | Bolotin et al. |
| 2008/0264767 A1 | 10/2008 | Chen et al. |
| 2008/0280651 A1 | 11/2008 | Duarte |
| 2008/0284742 A1 | 11/2008 | Prest |
| 2008/0293274 A1 | 11/2008 | Milan |
| 2009/0021267 A1 | 1/2009 | Golovchenko et al. |
| 2009/0026558 A1 | 1/2009 | Bauer et al. |
| 2009/0033635 A1 | 2/2009 | Wai |
| 2009/0036176 A1 | 2/2009 | Ure |
| 2009/0058687 A1 | 3/2009 | Rothkopf et al. |
| 2009/0058801 A1 | 3/2009 | Bull |
| 2009/0058802 A1 | 3/2009 | Orsley et al. |
| 2009/0073130 A1 | 3/2009 | Weber et al. |
| 2009/0078551 A1 | 3/2009 | Kang |
| 2009/0101417 A1 | 4/2009 | Suzuki et al. |
| 2009/0109181 A1 | 4/2009 | Hui et al. |
| 2009/0141046 A1 | 6/2009 | Rathnam et al. |
| 2009/0160771 A1 | 6/2009 | Hinckley et al. |
| 2009/0179854 A1 | 7/2009 | Weber et al. |
| 2009/0197059 A1 | 8/2009 | Weber et al. |
| 2009/0229892 A1 | 9/2009 | Fisher et al. |
| 2009/0273573 A1 | 11/2009 | Hotelling |
| 2010/0058251 A1 | 3/2010 | Rottler et al. |
| 2010/0060568 A1 | 3/2010 | Fisher et al. |
| 2010/0073319 A1 | 3/2010 | Lyon et al. |
| 2010/0099394 A1 | 4/2010 | Hainzl |
| 2010/0149127 A1 | 6/2010 | Fisher et al. |
| 2010/0289759 A1 | 11/2010 | Fisher et al. |
| 2010/0313409 A1 | 12/2010 | Weber et al. |
| 2011/0005845 A1 | 1/2011 | Hotelling et al. |
| 2011/0163996 A1 | 7/2011 | Wassvik et al. |
| 2011/0199624 A1 | 8/2011 | Iwaki |
| 2011/0285662 A1 | 11/2011 | Maenpaa |
| 2012/0075242 A1 | 3/2012 | Hotelling |
| 2012/0106728 A1 | 5/2012 | Ghaffari |
| 2014/0306911 A1 | 10/2014 | Zadesky et al. |
| 2015/0049059 A1 | 2/2015 | Zadesky et al. |
| 2015/0062050 A1 | 3/2015 | Zadesky et al. |
| 2015/0212608 A1 | 7/2015 | McKillop et al. |
| 2015/0331589 A1 | 11/2015 | Kawakita |
| 2016/0004278 A1 | 1/2016 | Hotelling |
| 2016/0004355 A1 | 1/2016 | Zadesky et al. |
| 2016/0154504 A1 | 6/2016 | Zadesky et al. |
| 2017/0010748 A1 | 1/2017 | Zadesky et al. |
| 2017/0010749 A1 | 1/2017 | Zadesky et al. |

FOREIGN PATENT DOCUMENTS

| | | |
|---|---|---|
| CN | 1139235 A | 1/1997 |
| CN | 1455615 | 11/2003 |
| CN | 1499356 | 5/2004 |
| CN | 1659506 | 8/2005 |
| DE | 3615742 | 11/1987 |
| DE | 9316194 U1 | 2/1995 |
| DE | 19722636 | 12/1998 |
| DE | 10022537 | 11/2000 |
| DE | 20019074 U1 | 2/2001 |
| DE | 103 04 704 | 8/2004 |
| DE | 103 08 514 | 9/2004 |
| DE | 10 2004 043 663 | 4/2006 |
| EP | 0178157 | 4/1986 |
| EP | 0419145 A1 | 3/1991 |
| EP | 0498540 | 8/1992 |
| EP | 0521683 A2 | 1/1993 |
| EP | 0 588 210 | 3/1994 |
| EP | 0674288 A1 | 9/1995 |
| EP | 0 731 407 A1 | 9/1996 |
| EP | 0551778 B1 | 1/1997 |
| EP | 0880091 | 11/1998 |
| EP | 1 018 680 | 7/2000 |
| EP | 1 026 713 | 8/2000 |
| EP | 1081922 A2 | 3/2001 |
| EP | 1098241 A2 | 5/2001 |
| EP | 1 133 057 | 9/2001 |
| EP | 1162826 A2 | 12/2001 |
| EP | 1 168 396 | 1/2002 |
| EP | 1 184 804 | 3/2002 |
| EP | 1205836 A2 | 5/2002 |
| EP | 1 244 053 | 9/2002 |

(56) References Cited

FOREIGN PATENT DOCUMENTS

| | | |
|---|---|---|
| EP | 1251455 A2 | 10/2002 |
| EP | 1263193 | 12/2002 |
| EP | 1347481 | 9/2003 |
| EP | 1376326 | 1/2004 |
| EP | 1 467 392 | 10/2004 |
| EP | 1482401 A2 | 12/2004 |
| EP | 1 496 467 | 1/2005 |
| EP | 1 510 911 | 3/2005 |
| EP | 1 513 049 | 3/2005 |
| EP | 1 517 228 | 3/2005 |
| EP | 1542437 A2 | 6/2005 |
| EP | 1 589 407 | 10/2005 |
| EP | 1 784 058 A2 | 5/2007 |
| EP | 1 841 188 | 10/2007 |
| EP | 1850218 | 10/2007 |
| EP | 1 876 711 | 1/2008 |
| FR | 2 686 440 A1 | 7/1993 |
| GB | 2015167 | 9/1979 |
| GB | 2072389 | 9/1981 |
| GB | 2315186 | 1/1998 |
| GB | 2333215 | 7/1999 |
| GB | 2 344 894 | 6/2000 |
| GB | 2391060 | 1/2004 |
| GB | 2402105 A | 12/2004 |
| JP | 55-174009 | 6/1982 |
| JP | 57-95722 | 6/1982 |
| JP | 57-97626 | 6/1982 |
| JP | 61-075981 | 4/1986 |
| JP | 61-117619 | 6/1986 |
| JP | 61-124009 | 6/1986 |
| JP | 61-164547 | 1/1988 |
| JP | 63-20411 | 1/1988 |
| JP | 63-106826 | 5/1988 |
| JP | 63-181022 | 7/1988 |
| JP | 63-298518 | 12/1988 |
| JP | 2-307114 | 12/1990 |
| JP | 03-57617 | 6/1991 |
| JP | 3-192418 | 8/1991 |
| JP | 03-237520 | 10/1991 |
| JP | 04-32920 | 2/1992 |
| JP | 4-205408 | 7/1992 |
| JP | 5-041135 | 2/1993 |
| JP | 5-080938 | 4/1993 |
| JP | 5-101741 | 4/1993 |
| JP | 05-36623 | 5/1993 |
| JP | 5-189110 | 7/1993 |
| JP | 5-205565 | 8/1993 |
| JP | 5-211021 | 8/1993 |
| JP | 5-217464 | 8/1993 |
| JP | 05-233141 | 9/1993 |
| JP | 05-257594 | 10/1993 |
| JP | 05-262276 | 10/1993 |
| JP | 5-265656 | 10/1993 |
| JP | 5-274956 | 10/1993 |
| JP | 05-289811 | 11/1993 |
| JP | 5-298955 | 11/1993 |
| JP | 5-325723 | 12/1993 |
| JP | 06-20570 | 1/1994 |
| JP | 6-084428 | 3/1994 |
| JP | 6-089636 | 3/1994 |
| JP | 6-96639 | 4/1994 |
| JP | 6-111695 | 4/1994 |
| JP | 6-139879 | 5/1994 |
| JP | 06-187078 | 7/1994 |
| JP | 06-208433 | 7/1994 |
| JP | 6-267382 | 9/1994 |
| JP | 06-283993 | 10/1994 |
| JP | 06-289969 | 10/1994 |
| JP | 6-333459 | 12/1994 |
| JP | 07-073278 | 3/1995 |
| JP | 7-107574 | 4/1995 |
| JP | 7-41882 | 7/1995 |
| JP | 7-201249 | 8/1995 |
| JP | 07-201256 | 8/1995 |
| JP | 07-253838 | 10/1995 |
| JP | 7-261899 | 10/1995 |
| JP | 7-261922 | 10/1995 |
| JP | 07-296670 | 11/1995 |
| JP | 7-319001 | 12/1995 |
| JP | 08-016292 | 1/1996 |
| JP | 8-115158 | 5/1996 |
| JP | 8-203387 | 8/1996 |
| JP | 8-293226 | 11/1996 |
| JP | 8-298045 | 11/1996 |
| JP | 08-299541 | 11/1996 |
| JP | 8-316664 | 11/1996 |
| JP | 09-044289 | 2/1997 |
| JP | 9-62448 | 3/1997 |
| JP | 09-069023 | 3/1997 |
| JP | 09-128148 | 5/1997 |
| JP | 9-134248 | 5/1997 |
| JP | 9-218747 | 8/1997 |
| JP | 9-230993 | 9/1997 |
| JP | 9-231858 | 9/1997 |
| JP | 09-233161 | 9/1997 |
| JP | 9-251347 | 9/1997 |
| JP | 9-258895 | 10/1997 |
| JP | 9-282987 | 10/1997 |
| JP | 9-288926 | 11/1997 |
| JP | 9-512979 | 12/1997 |
| JP | 10-003349 | 1/1998 |
| JP | 10-63467 | 3/1998 |
| JP | 10-74127 | 3/1998 |
| JP | 10-074429 | 3/1998 |
| JP | 10-198507 | 7/1998 |
| JP | 10-227878 | 8/1998 |
| JP | 10-240693 | 9/1998 |
| JP | 10-289061 | 10/1998 |
| JP | 10-293644 | 11/1998 |
| JP | 10-320322 | 12/1998 |
| JP | 10-326149 | 12/1998 |
| JP | 11-24834 | 1/1999 |
| JP | 11-184607 | 7/1999 |
| JP | 11-194863 | 7/1999 |
| JP | 11-194872 | 7/1999 |
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | A 1998-12010 | 7/1999 |
| JP | A 1998-12025 | 7/1999 |
| JP | A 1998-12026 | 7/1999 |
| JP | A 1998-12027 | 7/1999 |
| JP | A 1998-12028 | 7/1999 |
| JP | A 1998-12029 | 7/1999 |
| JP | 11-212725 | 8/1999 |
| JP | 1999-272378 | 10/1999 |
| JP | A 10-89535 | 10/1999 |
| JP | 11-327788 | 11/1999 |
| JP | 11-338628 | 12/1999 |
| JP | 2000-039964 A | 2/2000 |
| JP | 2000-163031 A | 6/2000 |
| JP | 2000-172441 | 6/2000 |
| JP | 2000-194507 | 7/2000 |
| JP | 2000-200147 | 7/2000 |
| JP | 2000-215549 | 8/2000 |
| JP | 2000-267777 | 9/2000 |
| JP | 2000-267786 | 9/2000 |
| JP | 2000-267797 | 9/2000 |
| JP | 2000-353045 | 12/2000 |
| JP | 2001-11769 | 1/2001 |
| JP | 2001-22508 | 1/2001 |
| JP | 2001-051790 | 2/2001 |
| JP | 2001-184158 | 7/2001 |
| JP | 2001-265519 | 9/2001 |
| JP | 2002-056747 | 2/2002 |
| JP | 3085481 | 2/2002 |
| JP | 2002-210863 | 7/2002 |
| JP | 2002-215311 | 8/2002 |
| JP | 2002-287889 | 10/2002 |
| JP | 2002-287903 | 10/2002 |
| JP | 2002-342033 A | 11/2002 |
| JP | 2003-015796 | 1/2003 |

(56) References Cited

FOREIGN PATENT DOCUMENTS

| | | |
|---|---|---|
| JP | 2003-029919 | 1/2003 |
| JP | 2003-060754 | 2/2003 |
| JP | 2003-099198 | 4/2003 |
| JP | 2003-150303 | 5/2003 |
| JP | 2003-517674 | 5/2003 |
| JP | 2003-173237 | 6/2003 |
| JP | 2003-280799 | 10/2003 |
| JP | 2003-280807 | 10/2003 |
| JP | 2004-170941 | 6/2004 |
| JP | 2004-184396 A | 7/2004 |
| JP | 2004-362097 | 12/2004 |
| JP | 2005-082086 | 3/2005 |
| JP | 2005-251218 | 9/2005 |
| JP | A 2005-99635 | 9/2005 |
| JP | 2005-285140 | 10/2005 |
| JP | 2005-293606 | 10/2005 |
| JP | A 2005-133824 | 10/2005 |
| JP | A 2005-134953 | 10/2005 |
| JP | 2006-4453 | 1/2006 |
| JP | A 2005-235579 | 1/2006 |
| JP | 2006-512626 | 4/2006 |
| JP | 2006-178962 | 7/2006 |
| JP | A 2005-358970 | 7/2006 |
| JP | 3852854 | 12/2006 |
| JP | 2007-123473 | 5/2007 |
| JP | A 2005-312433 | 5/2007 |
| JP | 2007-242035 | 9/2007 |
| JP | 2008-140182 | 6/2008 |
| KR | 1998-71394 | 10/1998 |
| KR | 1999-50198 | 7/1999 |
| KR | 2000-08579 | 2/2000 |
| KR | 2001-0052016 | 6/2001 |
| KR | 2001-108361 | 12/2001 |
| KR | 2002-65059 | 8/2002 |
| KR | 2004-0103125 | 12/2004 |
| KR | 10-2005-0006068 | 1/2005 |
| KR | 10-2006-0021678 | 3/2006 |
| TW | 431607 | 4/2001 |
| TW | 434606 | 5/2001 |
| TW | 00470193 | 12/2001 |
| TW | 547716 | 8/2003 |
| TW | I220491 | 8/2004 |
| TW | 200622841 | 7/2006 |
| WO | WO-92/11623 | 7/1992 |
| WO | WO-94-17494 | 8/1994 |
| WO | WO-95-00897 A1 | 1/1995 |
| WO | WO-1996-27968 | 9/1996 |
| WO | WO-98-14863 | 4/1998 |
| WO | WO-98/29886 | 7/1998 |
| WO | WO-98/43202 | 10/1998 |
| WO | WO-99-49443 | 9/1999 |
| WO | WO-00-79772 | 12/2000 |
| WO | WO-2001-002949 | 1/2001 |
| WO | WO-2001-044912 | 6/2001 |
| WO | WO-2001/74133 | 10/2001 |
| WO | WO-2002-08881 | 1/2002 |
| WO | WO-02/080210 | 10/2002 |
| WO | WO-02/089047 | 11/2002 |
| WO | WO-02/095564 | 11/2002 |
| WO | WO-03-044645 A1 | 5/2003 |
| WO | WO 03-044956 | 5/2003 |
| WO | WO-2003-025960 | 9/2003 |
| WO | WO 03-088176 | 10/2003 |
| WO | WO 2003-090008 | 10/2003 |
| WO | WO-2004-001573 | 12/2003 |
| WO | WO-2004/025449 | 3/2004 |
| WO | WO 04-040606 | 5/2004 |
| WO | WO-2004-091956 | 10/2004 |
| WO | WO-2005-055620 A2 | 6/2005 |
| WO | WO-2005/064442 | 7/2005 |
| WO | WO 05-076117 | 8/2005 |
| WO | WO-2005-114369 | 12/2005 |
| WO | WO-2005-124526 A2 | 12/2005 |
| WO | WO-2006-020305 | 2/2006 |
| WO | WO-2006-021211 A2 | 3/2006 |
| WO | WO 2006-037545 | 4/2006 |
| WO | WO 2006-104745 | 10/2006 |
| WO | WO-2006/104745 | 10/2006 |
| WO | WO-2006/135127 | 12/2006 |
| WO | WO 07-025858 | 3/2007 |
| WO | WO-2007-078477 | 7/2007 |
| WO | WO-2007-084467 | 7/2007 |
| WO | WO-2007-089766 | 8/2007 |
| WO | WO-2008-007372 | 1/2008 |
| WO | WO-2008/045414 | 4/2008 |
| WO | WO-2008-045833 | 4/2008 |
| WO | WO-2008/094791 | 8/2008 |

OTHER PUBLICATIONS

"Apple Presents iPod: Ultra-Portable MP3 Music Player Puts 1,000 Songs in Your Pocket," retreived from http;--www.apple.com-pr-library-2001-oct-23ipod.html on Oct. 23, 2001.
"Der Klangmeister," Connect Magazine, Aug. 1998.
"Neuros MP3 Digital Audio Computer," www.neurosaudio.com, downloaded Apr. 9, 2003.
"OEM Touchpad Modules" website www.glidepoint.com-sales-modules.index.shtml, downloaded Feb. 13, 2002.
"Product Overview—ErgoCommander®," www.logicad3d.com-products-ErgoCommander.htm, downloaded Apr. 8, 2002.
"Product Overview—SpaceMouse® Classic," www.logicad3d.com-products-Classic.htm, downloaded Apr. 8, 2002.
"Synaptics Tough Pad Interfacing Guide," Second Edition, Mar. 25, 1998, Synaptics, Inc., San Jose, CA, pp. 1-90.
"System Service and Troubleshooting Manual," www.dsplib.com-intv-Master, downloaded Dec. 11, 2002.
"Triax Custom Controllers due; Video Game Controllers," HFD—The Weekly Home Furnishing Newspaper 67(1) (Jan. 4, 1993).
"Alps Electric introduces the GlidePoint Wave Keyboard; combines a gently curved design with Alps' advanced GlidePoint Technology", Business Wire, (Oct. 21, 1996).
Alps Electric Ships GlidePoint Keyboard for the Macintosh; Includes a GlidePoint Touchpad, Erase-Eaze Backspace Key and Contoured Wrist Rest, Business Wire, (Jul. 1, 1996).
"APS show guide to exhibitors", Physics Today, 49(3) (Mar. 1996).
"Design News literature plus", Design News, 51(24) (Dec. 18, 1995).
"Diamond Multimedia Announces Rio PMP300 Portable MP3 Music Player," located at http:--news.harmony-central.com-Newp-1998-Rio-PMP300.html visited on May 5, 2008. (4 pages).
"Manufactures", Laser Focus World, Buyers Guide '96, 31(12) (Dec. 1995).
"National Design Engineering Show", Design News, 52(5) (Mar. 4, 1996).
"Preview of exhibitor booths at the Philadelphia show", Air Conditioning Heating & News, 200(2) (Jan. 13, 1997).
"Product news", Design News, 53(11) (Jun. 9, 1997).
"Product news", Design News, 53(9) (May 5, 1997).
"Touchpad," Notebook PC Manual, ACER Information Co. Ltd., Feb. 16, 2005, pp. 11-12.
Ahl, "Controller Update", Creative Computing vol. 9, No. 12, Dec. 1983, pp. 142-154.
Ahmad, "A Usable Real-Time 3D Hand Tracker," Proceedings of the 28th Asilomar Conference on Signals, Systems and Computers—Part 2 (of 2) vol. 2 (Oct. 1994), 5 pages.
Atari VCS-2600 Peripherals, www.classicgaming.com downloaded Feb. 28, 2007, pp. 1-15.
Baig, E.G., "Your PC Just Might Need a Mouse," U.S. News & World Report 108(22) (Jun. 4, 1990).
Bang & Olufsen Telecom a-s, "BeoCom 6000 User Guide 2000."
BeoCom 6000, Sales Training Brochure, date unknown.
Bartimo, Jim, "The Portables: Traveling Quickly", Computerworld (Nov. 14, 1983).
BeoCom 6000, Sales Training Brochure, date unknown.
Boling, Douglas (1993) "Programming Microsoft Windows CE.NET," p. 109.
Bollinger et al., U.S. Office Action dated Jun. 25, 2010, directed to U.S. Appl. No. 11/842,724; 22 pages.

(56) References Cited

OTHER PUBLICATIONS

Bollinger et al., U.S. Office Action dated Mar. 21, 2011, directed to U.S. Appl. No. 11/842,724; 22 pages.
Bollinger, U.S. Appl. No. 60/858,404, filed Nov. 13, 2006, entitled "Method of Capacitively Sensing Finger Position"; 13 pages.
Bray, "Phosphors help switch on xenon," Physics in Action, pp. 1-3, Apr. 1999.
Brink et al., "Pumped-up portables", U.S. News & World Report, 116(21) (May 30, 1994).
Brown et al., "Windows on Tablets as a Means of Achieving Virtual Input Devices", Human-Computer Interaction—INTERACT '90 (1990).
Bull, U.S. Office Action dated Feb. 4, 2011, directed to U.S. Appl. No. 11/849,801; 22 pages.
Bull, U.S. Office Action dated Jul. 9, 2010, directed to U.S. Appl. No. 11/849,801; 13 pages.
Buxton et al., "Issues and Techniques in Touch-Sensitive Tablet Input", Computer Graphics, 19(3), Proceedings of SIGGRAPH '85 (1985).
Chapweske, Adam "PS-2 Mouse-Keyboard Protocol," 1999, http:--panda.cs.ndsu.nodak.edu-~achapwes-PICmicro-PS2-ps2.htm.
Chen et al., "A Study in Interactive 3-D Rotation Using 2-D Control Devices", Computer Graphics 22(4) (Aug. 1988).
Chinese Office Action dated Dec. 29, 2006, directed to CN Application No. 200510103886.3, 25 pages.
De Meyer, Kevin, "Crystal Optical Mouse," Feb. 14, 2002, Heatseekerz, Web Article 19.
Elias et al., U.S. Office Action dated Jun. 11, 2010, directed to U.S. Appl. No. 11/203,692; 17 pages.
Elias et al., U.S. Office Action dated Mar. 30, 2010, directed to U.S. Appl. No. 11/203,692; 15 pages.
Elias et al., U.S. Office Action dated Nov. 22, 2010, directed to U.S. Appl. No. 11/203,692; 6 pages.
Elias et al., U.S. Appl. No. 60/522,107, filed Aug. 16, 2004, entitled, "A Method for Increasing the Spatial Resolution of Touch Sensitive Devices"; 15 pages.
Evans et al., "Tablet-based Valuators that Provide One, Two, or Three Degrees of Freedom", Computer Graphics 15(3) (Aug. 1981).
EVB Elektronik "TSOP6238 IR Receiver Modules for Infrared Remote Control Systems" dated Jan. 2004 1 page.
Final Office Action dated Apr. 15, 2013, for U.S. Appl. No. 11/882,004, filed Jul. 30, 2007, 18 pages.
Final Office Action dated Jan. 29, 2018, for U.S. Appl. No. 11/882,004, filed Jul. 30, 2007, 15 pages.
Fiore, "Zen Touch pad," Cornell University, May 2000, 6 pages.
Fisher et al., U.S. Appl. No. 61/036,804, filed Mar. 14, 2008 entitled "Switchable Sensor Configurations"; 46 pages.
Forsblad et al., U.S. Office Action dated Jan. 26, 2009, directed to U.S. Appl. No. 11/355,022; 15 pages.
Forsblad et al., U.S. Office Action dated Jun. 25, 2009, directed to U.S. Appl. No. 11/355,022; 18 pages.
Gadgetboy, "Point and click with the latest mice," CNET Asia Product Review, www.asia.cnet.com-reviews . . . are-gadgetboy-0,39001770,380235900,00.htm, downloaded Dec. 5, 2001.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Grignon et al., U.S. Appl. No. 60/755,656, filed Dec. 30, 2005, entitled "Touch Pad with Feedback"; 109 pages.
Hotelling et al., U.S. Office Action dated Jan. 27, 2009, directed to U.S. Appl. No. 11/882,421; 15 pages.
Hotelling, U.S. Office Action dated Sep. 1, 2009, directed to U.S. Appl. No. 11/482,286; 14 pages.
Hotelling, U.S. Office Action dated Jan. 25, 2010, directed to U.S. Appl. No. 11/482,286; 17 pages.
Hotelling et al., U.S. Office Action dated Mar. 30, 2010, directed to U.S. Appl. No. 11/483,008; 20 pages.
Hotelling, U.S. Office dated Jun. 9, 2010, directed to U.S. Appl. No. 11/482,286; 21 pages.
Hotelling, U.S. Office Action dated Aug. 18, 2010, directed to U.S. Appl. No. 11/882,424; 16 pages.
Hotelling, U.S. Office Action dated Oct. 1, 2010, directed to U.S. Appl. No. 11/482,286; 28 pages.
Hotelling et al., U.S. Office Action dated Oct. 27, 2010, directed to U.S. Appl. No. 11/483,008; 23 pages.
Hotelling, U.S. Office Action dated Dec. 8, 2010, directed to U.S. Appl. No. 11/482,286; 33 pages.
Hotelling, U.S. Appl. No. 60/658,777 titled "Multi-Functional Handheld Device," filed Mar. 4, 2005; 68 pages.
Interlink Electronics, VersaPad: Integration Guide, © 1998 (VersaPad), pp. 1-35.
International Search Report and Written Opinion, dated Dec. 6, 2007, directed to related International Application No. PCT-US2007-015501.
Jesitus, John , "Broken promises?", Industry Week-IW, 246(20) (Nov. 3, 1997).
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Kobayashi et al. (1994) "Development of the Touch Switches with the Click Response," Koukuu Denshi Gihou No. 17, pp. 44-48 (published by the Japan Aviation Electronics Industry, Ltd.).
Kobayashi et al. (1997) "Dynamic Soundscape: Mapping Time to Space for Audio Browsing," Computer Human Interaction: 16 pages.
Lampell et al., U.S. Appl. No. 60/810,423, filed Jun. 2, 2006, entitled "Techniques for Interactive Input to Portable Electronic Devices"; 53 pages.
Lampell, U.S. Office Action dated Sep. 15, 2009, directed to U.S. Appl. No. 11/530,807; 15 pages.
Lampell, U.S. Office Action dated Jun. 4, 2010, directed to U.S. Appl. No. 11/530,807; 15 pages.
Lampell, U.S. Office Action dated Dec. 3, 2010, directed to U.S. Appl. No. 11/530,807; 17 pages.
Lampell et al., U.S. Office Action dated Dec. 22, 2010, directed to U.S. Appl. No. 11/882,427; 16 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Letter re: Bang & Olufsen a-s by David Safran, Nixon Peabody, LLP, May 21, 2004, with BeoCom 6000 Sales Training Brochure, 7 pages.
Letter re: Bang & Olufsen a-s by David Safran, Nixon Peabody, LLP May 21, 2004.
Luna Technologies International, Inc., LUNA Photoluminescent Safety Products, "Photoluminescence—What is Photoluminescence?" from website at http:--www.lunaplast.com-photoluminescence.com on Dec. 27, 2005.
Lynch et al., U.S. Office Action dated Oct. 5, 2009, directed to U.S. Appl. No. 11/499,360; 7 pages.
Lynch et al., U.S. Office Action dated Jan. 27, 2010, directed to U.S. Appl. No. 11/499,360; 8 pages.
Marriott et al., U.S. Office Action dated Jul. 13, 2007, directed to U.S. Appl. No. 10/722,948; 15 pages.
Marriott et al., U.S. Office Action dated Jan. 30, 2008, directed to U.S. Appl. No. 10/722,948; 17 pages.
Marriott et al., U.S. Office Action dated Aug. 19, 2010, directed to U.S. Appl. No. 11/882,422; 13 pages.
McKillop et al., U.S. Office Action dated Sep. 16, 2010, directed to U.S. Appl. No. 11/591,752; 14 pages.
McKillop et al., U.S. Office Action dated Mar. 24, 2011, directed to U.S. Appl. No. 11/591,752; 11 pages.
Mims, Forrest M., III, "A Few Quick Pointers; Mouses, Touch Screens, Touch Pads, Light Pads, and The Like Can Make System Easier to Use," Computers & Electronics (22) (May 1984).
Nass, Richard, "Touchpad input device goes digital to give portable systems a desktop "mouse-like" feel", Electronic Design, 44(18) (Sep. 3, 1996).
Ng et al., U.S. Office Action dated Jan. 14, 2010, directed to U.S. Appl. No. 11/394,493; 20 pages.

(56) References Cited

OTHER PUBLICATIONS

Ng et al., U.S. Office Action dated Jan. 15, 2010, directed to U.S. Appl. No. 11/882,423; 22 pages.
Ng et al., U.S. Office Action dated Jun. 22, 2010, directed to U.S. Appl. No. 11/394,493; 14 pages.
Ng et al., U.S. Office Action dated Jul. 8, 2010, directed to U.S. Appl. No. 11/882,423; 19 pages.
Ng et al., U.S. Office Action dated Oct. 26, 2010, directed to U.S. Appl. No. 11/882,423; 18 pages.
Ng et al., U.S. Office Action dated Dec. 9, 2010, directed to U.S. Appl. No. 11/394,493; 13 pages.
Non-Final Office Action dated Jun. 16, 2017, for U.S. Appl. No. 11/882,004, filed Jul. 30, 2007, 15 pages.
Perenson, Melissa, "New & Improved: Touchpad Redux", PC Magazine (Sep. 10, 1996).
Petersen, Marty, "Koala Pad Touch Tablet & Micro Illustrator Software," InfoWorld (Oct. 10, 1983).
Petruzzellis, "Force-Sensing Resistors" Electronics Now, 64(3), (Mar. 1993).
Photographs of Innovation 2000 Best of Show Award Presented at the 2000 Int'l CES Innovations Design & Engineering Showcase, Jan. 6, 2000, 1 page.
Prest et al., U.S. Appl. No. 60/850,662, filed Oct. 11, 2006, entitled, "Capacitive Scroll Wheel"; 21 pages.
Prest et al., U.S. Office Action dated Jun. 22, 2010, directed to U.S. Appl. No. 11/878,132; 32 pages.
Prest et al., U.S. Office Action dated Jun. 22, 2010, directed to U.S. Appl. No. 11/882,882; 32 pages.
Prest et al., U.S. Office Action dated Jun. 22, 2010, directed to U.S. Appl. No. 11/882,890; 15 pages.
Prest et al., U.S. Office Action dated Jun. 22, 2010, directed to U.S. Appl. No. 11/812,383; 21 pages.
Prest et al., U.S. Office Action dated Jun. 23, 2010, directed to U.S. Appl. No. 11/812,384; 29 pages.
Prest et al., U.S. Office Action dated Jun. 23, 2010, directed to U.S. Appl. No. 11/882,889; 13 pages.
Rathnam et al., U.S. Office Action dated Mar. 24, 2011, directed to U.S. Appl. No. 12/205,757; 14 pages.
Rathnam et al., U.S. Appl. No. 60/992,056, filed Dec. 3, 2007, entitled, Scroll Wheel Circuit Arrangements And Methods Of Use Thereof; 42 pages.
Rathnam et al., U.S. Appl. No. 61/017,436, filed Dec. 28, 2007, entitled, "Multi-Touch Scroll Wheel Circuit Arrangements And Processing Methods"; 58 pages.
Robbin et al., U.S. Office Action dated Sep. 30, 2004, directed to U.S. Appl. No. 10/259,159; 14 pages.
Robbin et al., U.S. Office Action dated Jun. 16, 2005, directed to U.S. Appl. No. 10/259,159; 16 pages.
Robbin et al., U.S. Office Action dated Jan. 11, 2006, directed to U.S. Appl. No. 10/259,159; 15 pages.
Robbin et al., U.S. Office Action dated Aug. 3, 2006, directed to U.S. Appl. No. 10/259,159; 15 pages.
Robbin et al., U.S. Office Action dated Oct. 13, 2006, directed to U.S. Appl. No. 10/259,159; 18 pages.
Robbin et al., U.S. Office Action dated Jan. 18, 2007, directed to U.S. Appl. No. 10/259,159; 18 pages.
Robbin et al., U.S. Office Action dated Aug. 10, 2009, directed to U.S. Appl. No. 11/610,376; 11 pages.
Robbin et al., U.S. Office Action dated Aug. 12, 2009, directed to U.S. Appl. No. 11/610,384; 20 pages.
Robbin et al., U.S. Office Action dated Oct. 29, 2010, directed to U.S. Appl. No. 11/838,845; 8 pages.
Robbin et al., U.S. Office Action dated Apr. 26, 2011, directed to U.S. Appl. No. 11/838,845; 9 pages.
Robbin et al., U.S. Appl. No. 60/387,692 entitled "Method and Apparatus for Use of Rotational User Inputs," filed Jun. 10, 2002.
Robbin et al., U.S. Appl. No. 60/399,806 entitled "Graphical User Interface and Methods of Use Thereof in a Multimedia Player," filed Jul. 30, 2002.
Robbin, U.S. Appl. No. 60/346,237 entitled, "Method and System for List Scrolling," filed Oct. 22, 2001; 12 pages.
Rothkopf, U.S. Appl. No. 60/935,854 titled "Compact Media Players," filed Sep. 4, 2007; 36 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
SanDisk Sansa Connect User Guide, 2007; 29 pages.
SanDisk Sansa Connect User Guide; 29 pages.
Soderholm, Lars G., "Sensing Systems for 'Touch and Feel,'" Design News (May 8, 1989): pp. 72-76.
Sony presents "Choice Without Compromise" at IBC '97 M2 Presswire (Jul. 24, 1997).
Spiwak, Marc, "A Great New Wireless Keyboard", Popular Electronics, 14(12) (Dec. 1997).
Spiwak, Marc, "A Pair of Unusual Controllers", Popular Electronics 14(4) (Apr. 1997).
Sylvania, "Intellvision™ Intelligent Television Master Component Service Manual," pp. 1, 2 and 8, 1979.
Tessler, Franklin, "Point Pad", Macworld 12(10) (Oct. 1995).
Tessler, Franklin, Smart Input: How to Chose from the New Generation of Innovative Input Devices, Macworld 13(5) (May 1996).
Tessler, Franklin, "Touchpads", Macworld 13(2) (Feb. 1996).
Translation of Trekstor's Defense Statement to the District Court Mannheim of May 23, 2008; 37 pages.
Tsuk et al., U.S. Office Action dated Sep. 30, 2004, directed to U.S. Appl. No. 10/256,716; 11 pages.
Tsuk et al., U.S. Office Action dated Jun. 24, 2005, directed to U.S. Appl. No. 10/256,716; 12 pages.
Tsuk et al., U.S. Office Action dated Jan. 10, 2006, directed to U.S. Appl. No. 10/256,716; 12 pages.
Tsuk et al., U.S. Office Action dated Aug. 3, 2006, directed to U.S. Appl. No. 10/256,716; 15 pages.
Tsuk et al., U.S. Office Action dated Oct. 13, 2006, directed to U.S. Appl. No. 10/256,716; 16 pages.
Tsuk et al., U.S. Office Action dated Jul. 7, 2009, directed to U.S. Appl. No. 11/610,190; 24 pages.
Tsuk et al., U.S. Office Action dated Aug. 7, 2009, directed to U.S. Appl. No. 11/610,181; 20 pages.
Tsuk et al., U.S. Office Action dated Dec. 31, 2009, directed to U.S. Appl. No. 11/610,190; 25 pages.
Tsuk et al., U.S. Office Action dated Apr. 28, 2010, directed to U.S. Appl. No. 11/610,190; 29 pages.
Tsuk et al., U.S. Office Action dated Aug. 6, 2010, directed to U.S. Appl. No. 11/610,190; 30 pages.
Tsuk et al., U.S. Office Action dated Oct. 26, 2010, directed to U.S. Appl. No. 11/959,942; 27 pages.
Tsuk et al., U.S. Office Action dated Nov. 1, 2010, directed to U.S. Appl. No. 11/959,918; 8 pages.
Tsuk et al., U.S. Office Action dated Mar. 31, 2011, directed to U.S. Appl. No. 11/959,918; 9 pages.
Tsuk et al., U.S. Office Action dated Apr. 19, 2011, directed to U.S. Appl. No. 11/610,190; 25 pages.
U.S. Appl. No. 10/060,712, filed Jan. 29, 2002.
U.S. Appl. No. 10/209,537, filed Jul. 30, 2002.
Weber et al., U.S. Office Action dated Jun. 7, 2010, directed to U.S. Appl. No. 11/856,530; 15 pages.
Weber et al., U.S. Office Action dated Oct. 13, 2010, directed to U.S. Appl. No. 12/205,795; 15 pages.
Weber et al, U.S. Office Action dated Jan. 7, 2011, directed to U.S. Appl. No. 11/856,530; 13 pages.
Weber et al., U.S. Office Action dated Jan. 7, 2011, directed to U.S. Appl. No. 12/205,795; 21 pages.
Weber et al., U.S. Office Action dated Feb. 17, 2011, directed to U.S. Appl. No. 12/844,502; 11 pages.
Weber et al., U.S. Appl. No. 61/020,531, filed Jan. 11, 2008 entitled "Modifiable Clickwheel Text"; 11 pages.
Weber et al., U.S. Appl. No. 61/025,531, filed Feb. 1, 2008 entitled "Co-Extruded Materials and Methods"; 11 pages.

(56) References Cited

OTHER PUBLICATIONS

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Zadesky et al., U.S. Appl. No. 60/359,551 entitled "Touchpad for Handheld Device," filed Feb. 25, 2002; 34 pages.
Zadesky et al., U.S. Appl. No. 60/714,609 entitled "Scrolling Input Arranoements Usino Capacitive Sensors on a Flexible Membrane," filed Sep. 6, 2005.
Zadesky, S. P. et al., U.S. Office Action dated Dec. 14, 2011, directed to U.S. Appl. No. 11/882,003; 12 pages.
Zadesky et al., U.S. Office Action dated Mar. 4, 2004, directed to U.S. Appl. No. 10/188,182; 8 pages.
Zadesky et al., U.S. Office Action dated Jul. 30, 2004, directed to U.S. Appl. No. 10/188,182; 7 pages.
Zadesky et al., U.S. Office Action dated Sep. 21, 2005, directed to U.S. Appl. No. 10/188,182; 10 pages.
Zadesky et al., U.S. Office Action dated Oct. 27, 2006, directed to U.S. Appl. No. 10/643,256; 14 pages.
Zadesky et al., U.S. Office Action dated Mar. 23, 2007, directed to U.S. Appl. No. 10/643,256; 11 pages.
Zadesky et al., U.S. Office Action dated Jul. 13, 2007, directed to U.S. Appl. No. 10/643,256; 13 pages.
Zadesky et al., U.S. Office Action dated Oct. 4, 2007, directed to U.S. Appl. No. 11/386,238; 12 pages.
Zadesky et al.., U.S. Office Action dated Oct. 4, 2007, directed to U.S. Appl. No. 11/806,957; 14 pages.
Zadesky et al., U.S. Office Action dated Nov. 20, 2007, directed to U.S. Appl. No. 11/057,050; 33 pages.
Zadesky et al., U.S. Office Action dated Dec. 12, 2007, directed to U.S. Appl. No. 10/643,256; 12 pages.
Zadesky et al., U.S. Office Action dated Jul. 9, 2008, directed to U.S. Appl. No. 10/643,256; 12 pages.
Zadesky et al, U.S. Office Action dated Aug. 19, 2008, directed to U.S. Appl. No. 11/057,050; 23 pages.
Zadesky et al., U.S. Office Action dated Nov. 26, 2008, directed to U.S. Appl. No. 11/057,050; 25 pages.
Zadesky et al., U.S. Office Action dated Dec. 24, 2008, directed to U.S. Appl. No. 11/057,050; 25 pages.
Zadesky et al., U.S. Office Action dated Feb. 20, 2009, directed to U.S. Appl. No. 11/057,050; 25 pages.
Zadesky et al., U.S. Office Action dated Mar. 5, 2009, directed to U.S. Appl. No. 11/477,469; 12 pages.
Zadesky et al., U.S. Office Action dated Aug. 6, 2009, directed to U.S. Appl. No. 11/057,050; 30 pages.
Zadesky et al., U.S. Office Action dated Feb. 4, 2010, directed to U.S. Appl. No. 11/477,469; 14 pages.
Zadesky et al., U.S. Office Action dated Mar. 30, 2010, directed to U.S. Appl. No. 11/592,679; 13 pages.
Zadesky et al., U.S. Office Action dated Aug. 2, 2010, directed to U.S. Appl. No. 11/882,004; 8 pages.
Zadesky et al., U.S. Office Action dated Sep. 29, 2010, directed to U.S. Appl. No. 11/882,003; 13 pages.
Zadesky et al., U.S. Office Action dated Oct. 4, 2010, directed to U.S. Appl. No. 11/057,050; 31 pages.
Zadesky et al., U.S. Office Action dated Nov. 16, 2010, directed to U.S. Appl. No. 11/477,469; 13 pages.
Zadesky et al, U.S. Office Action dated Feb. 1, 2011, directed to U.S. Appl. No. 11/882,004; 15 pages.
Zadesky et al., U.S. Office Action dated Mar. 16, 2011, directed to U.S. Appl. No. 11/882,003; 12 pages.
Zadesky et al., U.S. Office Action dated Mar. 31, 2011, directed to U.S. Appl. No. 11/882,005; 7 pages.
Zadesky et al, U.S. Office Action dated Jan. 17, 2012, directed to U.S. Appl. No. 11/882,004; 13 pages.
Zadesky et al., U.S. Office Action dated Jun. 15, 2012, directed to U.S. Appl. No. 11/882,003; 13 pages.
Zadesky et al, U.S. Office Action dated Jun. 19, 2012, directed to U.S. Appl. No. 11/882,004; 13 pages.
Zadesky et al., Office Action dated Sep. 20, 2012, directed to U.S. Appl. No. 11/882,003; 8 pages.
Zadesky et al, U.S. Office Action dated Oct. 26, 2012, directed to U.S. Appl. No. 11/882,004; 16 pages.
Zadesky et al., U.S. Office Action dated Feb. 7, 2014, directed to U.S. Appl. No. 11/882,004; 20 pages.
Zadesky et al., U.S. Office Action dated Jul. 10, 2014, directed to U.S. Appl. No. 11/882,004; 18 pages.
Zadesky et al., U.S. Office Action dated Nov. 21, 2014, directed to U.S. Appl. No. 11/882,004; 18 pages.
Zadesky et al., U.S. Office Action dated Mar. 24, 2015, directed to U.S. Appl. No. 11/882,004; 20 pages.
Zadesky et al., U.S. Office Action dated Jun. 10, 2015, directed to U.S. Appl. No. 11/882,004; 21 pages.
"How do touchscreen monitors know where you're touching?" obtained from http://www.electronics.howstuffworks.com/question716.html generated Jul. 7, 2008; 2 pages.
"T9® Txt Input for Keypad Devices," http://tegic.com, Nov. 18, 2005, one page.
Apple Computer, Inc., "Block Diagram and Buses" Apple Developer Connection, Aug. 3, 2004 downloaded from the Internet from http://developer.apple.com/documentation/Hardware/Developer_Notes/Macintosh_CPUs-G . . . (4 pages).
Apple Computer, Inc., "Powerbook G4" Technology Overview, Apr. 2004 (29 pages).
"Apple IPod Mini," www.apple.com (Jan. 6, 2004).
Apple Presents iPod: Ultra-Portable MP3 Music Player Puts 1,000 Songs in Your Pocket, retreived from htto:l/www.annle.com/or/librarv/2001/oct/23iood.html on Oct. 23, 2001.
Apple Unveils Optical Mouse and New Pro Keyboard, Press Release, Jul. 19, 2000.
Casario, M., "Hands on Macromedia World: Touch Screen Keypad for Mobile Phone by DoCoMo," printed Nov. 18, 2005, 1 page.
Day, B. "Will Cell Phones Render iPods Obsolete?" http://webblogs.javanet/pub/wig/883, printed Dec. 12, 2005, 3 pages.
Delta II™ Keypads, "Introducing the Ultimate Smartphone Keypad," http://www.chicagologic.com, printed Nov. 18, 2005, 2 pages.
Der Klanomeister, Connect Magazine, Aug. 1998.
DigitWireless, Fastap™ http://www/digitwireless.com/about/faq.html, Dec. 6, 2005; 5pages.
DigitWireless, "Fastap™ Keypads Redefine Mobile Phones," http://www/digitwireless.com printed Nov. 18, 2005; ten pages.
Extended European Search Report dated Mar. 4, 2015, for EP Patent Application No. 14188138.3; nine pages.
Extended European Search Report dated Sep. 6, 2011, directed to EP Patent Application No. 10011508.8; 10 pages.
Final Office Action dated Aug. 19, 2008, for U.S. Appl. No. 11/057,050, filed Feb. 11, 2005, 22 pages.
Final Office Action dated Dec. 24, 2008, for U.S. Appl. No. 11/057,050, filed Feb. 11, 2005, 24 pages.
Final Office Action dated Aug. 6, 2009, for U.S. Appl. No. 11/057,050, filed Feb. 11, 2005, 29 pages.
Final Office Action dated Feb. 4, 2010, for U.S. Appl. No. 11/477,469, filed Jun. 28, 2006, 13 pages.
Final Office Action dated Oct. 4, 2010, for U.S. Appl. No. 11/057,050, filed Feb. 11, 2005, 31 pages.
Final Office Action dated Mar. 24, 2011, for U.S. Appl. No. 11/591,752, filed Nov. 1, 2006, 11 pages.
Final Office Action dated Sep. 27, 2011, for U.S. Appl. No. 11/057,050, filed Feb. 11, 2005, 37 pages.
Final Office Action dated Oct. 26, 2011, for U.S. Appl. No. 11/057,050, filed Feb. 11, 2005, 37 pages.
Final Office Action dated Oct. 25, 2012, for U.S. Appl. No. 11/882,005, filed Jul. 30, 2007, 12 pages.
Final Office Action dated Jun. 25, 2015, for U.S. Appl. No. 11/477,469, filed Jun. 28, 2006, 14 pages.
Final Office Action dated Aug. 24, 2015, for U.S. Appl. No. 14/527,585, filed Oct. 29, 2014, 12 pages.
Final Office Action dated Jan. 12, 2016, for U.S. Appl. No. 14/678,578, filed Apr. 3, 2015, 10 pages.

(56) References Cited

OTHER PUBLICATIONS

Final Office Action dated Feb. 4, 2016, for U.S. Appl. No. 14/535,101, filed Nov. 6, 2014, seven pages.
Final Office Action dated Feb. 24, 2016, for U.S. Appl. No. 14/850,905, filed Sep. 10, 2015, 10 pages.
Final Office Action dated Apr. 20, 2016, for U.S. Appl. No. 14/850,901, filed Sep. 10, 2015, 11 pages.
Final Office Action dated Aug. 23, 2016, for U.S. Appl. No. 11/057,050, filed Feb. 11, 2005, 22 pages.
Final Office Action dated Sep. 22, 2016, for U.S. Appl. No. 14/527,585, filed Oct. 29, 2014, 14 pages.
Final Office Action dated Oct. 24, 2016, for U.S. Appl. No. 14/850,905, filed Sep. 10, 2015, 12 pages.
Final Office Action dated Oct. 28, 2016, for U.S. Appl. No. 14/678,578, filed Apr. 3, 2015, 10 pages.
Final Office Action dated Mar. 21, 2017, for U.S. Appl. No. 15/017,371, filed Feb. 5, 2016, 42 pages.
Final Office Action dated Apr. 28, 2017, for U.S. Appl. No. 14/535,101, filed Nov. 6, 2014, nine pages.
Final Office Action dated May 15, 2017, for U.S. Appl. No. 14/850,901, filed Sep. 10, 2015, fourteen pages.
Final Office Action dated Sep. 22, 2017, for U.S. Appl. No. 14/527,585, filed Oct. 29, 2014, eight pages.
Final Office Action dated Oct. 5, 2017, for U.S. Appl. No. 14/850,905, filed Sep. 10, 2015, 16 pages.
Final Office Action dated Dec. 15, 2017, for U.S. Appl. No. 14/678,578, filed Apr. 3, 2015, eleven pages.
Final Office Action dated Jan. 31, 2018, for U.S. Appl. No. 14/253,299, filed Apr. 15, 2014, 30 pages.
Final Office Action dated May 18, 2018, for U.S. Appl. No. 14/535,101, filed Nov. 6, 2014, nine pages.
Final Office Action dated Jul. 31, 2018, for U.S. Appl. No. 15/274,747, filed Sep. 23, 2016, 19 pages.
Final Office Action dated Aug. 27, 2018, for U.S. Appl. No. 15/274,754, filed Sep. 23, 2016, 12 pages.
Final Office Action dated Nov. 2, 2018, for U.S. Appl. No. 14/850,901, filed Sep. 10, 2015, nine pages.
Final Office Action dated Dec. 20, 2018, for U.S. Appl. No. 14/678,578, filed Apr. 3, 2015, 12 pages.
Gibbs, K. "I've Got a Suggestion," posted on the Google Blog, Dec. 10, 2004, http://googleblog.blogspot.com.
Google, "Google Suggest FAQ," Google.com, retrieved on Apr. 1, 2009, from http://labs.google.com/suggestfaq.
Hotelling et al., U.S. Office Action dated Jul. 24, 2009, directed to U.S. Appl. No. 11/483,008; 16, pages.
Hotelling et al., U.S. Office Action dated Jul. 27, 2009, directed to U.S. Appl. No. 11/882,420; 16 pages.
ISR dated Oct. 15, 2003 directed to corresponding application No. PCT/US2002/33805; 3 pages.
ISR dated Oct. 16, 2003 directed to corresponding application No. PCT/US02/33861; 3 pages.
ISR dated May 7, 2007, directed to corresponding application No. PCT/US2006/045682; 2 pages.
Mattel. (2002). "System Service and Troubleshooting Manual descriptions," *Mattel Electronics Intellivision Intelligent Television*, located at www.dsplib.com/i ntv . . . , last visited Dec. 11, 2002, one page.
McAlister, J. "News + Suggest Join Forces," Apr. 28, 2006, posted on the Google Blog, http://googleblog.blogspot.com.
McKillop et al., U.S. Office Action dated Oct. 25, 2012, directed to U.S. Appl. No. 11/591,752; 11 pages.
MobileTouch "Synaptics: Handy Wie Einen iPod Bedienen," Sep. 21, 2004, 1 page, http://www.golem.de/0409/33706.html.
Nokia, "7280 Bedienungsanleitung" 2005, pp. 1-149, http://web.archive.org/web/20051222023851/http://nds1.nikia.com/phones/files/guides/nokia7280_UDG-de.pdf.
Nokia, "7280 Interaktive Demos" screenshot Nov. 25, 2005, 1 page, http://web.archive.org/web/2005112502636/europe.nokia.com/support/tutorials/7280/german/index.html.
Nokia, "Nokia 7280 User manual," Nov. 25, 2004, 132 pages, http://nds1.nokia.com/phones/files/guides/Nokia_7280_UG-en.pdf.
Nokia, "Nokia 7280: Interactive Demonstrations," 7 pages, 2004, http://nokia.com/EUROPE_NOKIA_COM_3/r2/support/tutorials/7280/english/indes.html.
Non-Final Office Action dated Nov. 20, 2007, for U.S. Appl. No. 11/057,050, filed Feb. 11, 2005, 32 pages.
Non-Final Office Action dated Nov. 26, 2008, for U.S. Appl. No. 11/057,050, filed Feb. 11, 2005, 24 pages.
Non-Final Office Action dated Feb. 20, 2009, for U.S. Appl. No. 11/057,050, filed Feb. 11, 2005, 24 pages.
Non-Final Office Action dated Mar. 5, 2009, for U.S. Appl. No. 11/477,469, filed Jun. 28, 2006, 11 pages.
Non-Final Office Action dated Nov. 16, 2010, for U.S. Appl. No. 11/477,469, filed Jun. 28, 2006, 12 pages.
Non-Final Office Action dated May 25, 2011, for U.S. Appl. No. 11/057,050, filed Feb. 11, 2005, 32 pages.
Non-Final Office Action dated Mar. 6, 2012, for U.S. Appl. No. 11/591,752, filed Nov. 1, 2006, 11 pages.
Non-Final Office Action dated Jun. 7, 2012, for U.S. Appl. No. 11/882,005; filed Jul. 30, 2007, 11 pages.
Non-Final Office Action dated Jul. 11, 2013, for U.S. Appl. No. 11/882,005, filed Jul. 30, 2007, 12 pages.
Non-Final Office Action dated Dec. 19, 2014, for U.S. Appl. No. 14/166,784, filed Jan. 28, 2014, 11 pages.
Non-Final Office Action dated Jan. 2, 2015, for U.S. Appl. No. 11/477,469, filed Jun. 28, 2006, 13 pages.
Non-Final Office Action dated Feb. 3, 2015, for U.S. Appl. No. 14/527,585, filed Oct. 29, 2014, 11 pages.
Non-Final Office Action dated May 12, 2015, for U.S. Appl. No. 14/535,101, filed Nov. 6, 2014, seven pages.
Non-Final Office Action dated Jun. 29, 2015, for U.S. Appl. No. 14/678,578, filed Apr. 3, 2015, 13 pages.
Non-Final Office Action dated Nov. 12, 2015, for U.S. Appl. No. 14/850,901, filed Sep. 10, 2015, 10 pages.
Non-Final Office Action dated Nov. 16, 2015, for U.S. Appl. No. 14/850,905, filed Sep. 10, 2015, 8 pages.
Non-Final Office Action dated Mar. 11, 2016, for U.S. Appl. No. 11/057,050, filed Feb. 11, 2005, 18 pages.
Non-Final Office Action dated Mar. 14, 2016, for U.S. Appl. No. 14/527,585, filed Oct. 29, 2014, 13 pages.
Non-Final Office Action dated Jul. 18, 2016, for U.S. Appl. No. 14/850,905, filed Sep. 10, 2015, twelve pages.
Non-Final Office Action dated Aug. 11, 2016, for U.S. Appl. No. 14/535,101, filed Nov. 6, 2014, eight pages.
Non-Final Office Action dated Sep. 9, 2016, for U.S. Appl. No. 14/850,901, filed Sep. 10, 2015, 12 pages.
Non-Final Office Action dated Mar. 24, 2017, for U.S. Appl. No. 14/527,585, filed Oct. 29, 2014, eight pages.
Non-Final Office Action dated Mar. 27, 2017, for U.S. Appl. No. 14/850,905, filed Sep. 10, 2015, twelve pages.
Non-Final Office Action dated May 11, 2017, for U.S. Appl. No. 14/678,578, filed Apr. 3, 2015, 14 pages.
Non-Final Office Action dated Jul. 25, 2017, for U.S. Appl. No. 14/253,299, filed Apr. 15, 2014, 29 pages.
Non-Final Office Action dated Nov. 15, 2017, for U.S. Appl. No. 14/535,101, filed Nov. 6, 2014, eight pages.
Non-Final Office Action dated Nov. 17, 2017, for U.S. Appl. No. 15/274,747, filed Sep. 23, 2016, 27 pages.
Non-Final Office Action dated Nov. 30, 2017, for U.S. Appl. No. 15/274,754, filed Sep. 23, 2016, 13 pages.
Non-Final Office Action dated Feb. 8, 2018, for U.S. Appl. No. 14/850,901, filed Sep. 10, 2015, seven pages.
Non-Final Office Action dated Apr. 4, 2018, for U.S. Appl. No. 14/678,578, filed Apr. 3, 2015, ten pages.
Non-Final Office Action dated Apr. 9, 2018, for U.S. Appl. No. 14/527,585, filed Oct. 29, 2014, ten pages.
Non-Final Office Action dated Jan. 10, 2019, for U.S. Appl. No. 16/196,772, filed Nov. 20, 2018, twelve pages.
Notice of Allowance dated Sep. 14, 2015, for U.S. Appl. No. 14/166,784, filed Jan. 28, 2014, eight pages.
Notice of Allowance dated Dec. 18, 2015, for U.S. Appl. No. 11/057,050, filed Feb. 11, 2005, nine pages.
Notice of Allowance dated Feb. 26, 2016, for U.S. Appl. No. 14/166,784, filed Jan. 28, 2014, seven pages.

(56) References Cited

OTHER PUBLICATIONS

Notice of Allowance dated Feb. 9, 2018, for U.S. Appl. No. 14/850,905, filed Sep. 10, 2015, nine pages.
Notice of Allowance dated Apr. 12, 2018, for U.S. Appl. No. 13/605,544, filed Sep. 6, 2012, nine pages.
Notice of Allowance dated Jul. 3, 2018, for U.S. Appl. No. 14/850,905, filed Sep. 10, 2015, five pages.
Notice of Allowance dated Oct. 11, 2018, for U.S. Appl. No. 14/850,905, filed Sep. 10, 2015, five pages.
Notice of Allowance dated Oct. 29, 2018, for U.S. Appl. No. 13/605,544, filed Sep. 6, 2012, eight pages.
O'Neal, W., Sr. E., et al., "Smart Phones with Hidden Keybaords," printed Nov. 18, 2005, 3 pages, http://msc.com/4250-6452_16-6229969-1.html.
Phoneyworld, "You heard of Touch Screens Now Check Out Touch Keys" printed Nov. 18, 2005, 2 pages, http://www.phoneyworld.com.
Prest et al., U.S. Office Action dated Jan. 11, 2013, directed to U.S. Appl. No. 13/544,527; 7 pages.
Prest et al., U.S. Office Action dated May 16, 2013, directed to U.S. Appl. No. 13/605,544; 5 pages.
Prest et al., U.S. Office Action dated May 16, 2013, directed to U.S. Appl. No. 13/544,527; 7 pages.
Prest et al., U.S. Office Action dated Sep. 27, 2013, directed to U.S. Appl. No. 13/544,527; 7 pages.
Prest et al., U.S. Office Action dated Oct. 10, 2013, directed to U.S. Appl. No. 13/605,544; 8 pages.
Prest et al., U.S. Office Action dated Jan. 24, 2014, directed to U.S. Appl. No. 13/605,544; 10 pages.
Prest et al., U.S. Office Action dated Feb. 6, 2014, directed to U.S. Appl. No. 13/544,527; 9 pages.
Prest et al., U.S. Office Action dated May 9, 2014, directed to U.S. Appl. No. 13/605,544; 11 pages.
Prest et al., U.S. Office Action dated Oct. 31, 2014, directed to U.S. Appl. No. 13/605,544; 8 pages.
Prest et al., U.S. Office Action dated Mar. 4, 2015, directed to U.S. Appl. No. 13/605,544; 8 pages.
Prest et al., U.S. Office Action dated Apr. 30, 2015, directed to U.S. Appl. No. 13/605,544; 8 pages.
Prest et al., U.S. Office Action dated Dec. 10, 2015, directed to U.S. Appl. No. 13/605,544; 8 pages.
Prest et al., U.S. Office Action dated Apr. 27, 2016, directed to U.S. Appl. No. 13/605,544; 10 pages.
Prest et al., U.S. Office Action dated Jan. 31, 2017, directed to U.S. Appl. No. 13/605,544; nine pages.
Prest et al., U.S. Office Action dated Sep. 8, 2017, directed to U.S. Appl. No. 13/605,544; 19 pages.
Product Overview—ErgoCommander®, www.logi cad3d.com/products/ErgoCommander.html, downloaded Apr. 8, 2002.
Sears, A., et al., "Data Entry for Mobile Devices Using Soft Keyboards: Understanding the Effects of Keybaord Size and User Tasks," Abstract, Int'l Journal of Human-Computer Interaction, 2003, vol. 16, No. 2, 23 pages.
Solutions for Humans, "Compare Keyboards with the Keyboard Compatibility Chart, Learn More About Alternative Keyboards," printed Dec. 8, 2005, 5 pages, http://www.keyalt.com/kkeybrdp.html.
Synaptics Touch Pad Interfacing Guide, Second Edition, Mar. 25, 1998, Synaptics, Inc., San Jose, CA, pp. 1-90.
Technology Loan Catalog, "Devices," printed Jun. 6, 2008, 9 pages http://www.tsbvi.edu/outreach/techloan/catalog.html.
Textually, "LG Develops New Touch Pad Cell Phones," printed Nov. 18, 2005, 1 page, http://textually.org/textually/archives/2005/06/009903.html.
Textually, "Microsoft New-Smart Phone Interface: Your Thumb," printed Nov. 18, 2005, 2 pages, http://www.textually.org.
Textually, "Samsung Releases Keyboard Phone in US," printed Nov. 18, 2005, 1 page, http://www.textually.org/textually/archives/2005/11/010482.html.
Torrone, P., "Google Suggest: The Movie," Dec. 11, 2004, posted on www.Engadget.com.
TouchPad Advanced Features, Synaptics, "Enriching the Interaction Between Humans and Intelligent Devices," Downloaded Aug. 16, 2004 (2 pages) http://www.synaptics.com/products/touchpad_features.cfm.
Trackpad, Apple Developer Connection (last updated Apr. 19, 2004, printed Aug. 19, 2004) (3 pages) http://developer.apple.com/documentation/Hardware/Developer_Notes/Macintosh_CPUs-....
Web Archive: web.archive.org/web/*/http://nds1.nokia.com/phones/files/guides/Nokia_7280_UG_en.pdf; Jun. 19, 2009.
WikiPodLinux, "Four-Button Keyboard," printed Dec. 5, 2005, 2 pages, http://ipodlinux.org/Four-Button_Keyboard.
WikiPodLinux, "Text Input (legacy)," downloaded Dec. 5, 2005, 8 pages, http://ipodlinux.org/Text_Input_%28legacy%29.
WikiPodLinux, "Text Input Concepts," Dec. 2005, printed Jun. 17, 2008, 3 pages, http://web/archive.org/web/20051211162524/http://ipodlinux.org/Text_Input_Concepts.
WikiPodLinux, "Text Input Methods," printed Dec. 5, 2005, 8 pages, http://ipodlinux.org/Text_Input_Methods.
Zadesky et al., U.S. Office Action dated Sep. 10, 2015, directed to U.S. Appl. No. 14/253,299; 19 pages.
Zadesky et al., U.S. Office Action dated Feb. 4, 2016, directed to U.S. Appl. No. 14/253,299; 18 pages.
Zadesky et al., U.S. Office Action dated Jun. 20, 2016, directed to U.S. Appl. No. 14/253,299; 25 pages.
Zadesky et al., U.S. Office Action dated Sep. 21, 2016, directed to U.S. Appl. No. 15/017,371; 24 pages.
Zadesky et al., U.S. Office Action dated Nov. 25, 2016, directed to U.S. Appl. No. 14/253,299; 28 pages.

INPUT APPARATUS AND BUTTON ARRANGEMENT FOR HANDHELD DEVICE

CROSS-REFERENCE TO RELATED APPLICATIONS

This application is a continuation of U.S. patent application Ser. No. 11/882,004 (now U.S. Publication No. 2008-0018615), filed on Jul. 30, 2007, which is a continuation of U.S. patent application Ser. No. 11/806,957 (now U.S. Pat. No. 7,333,092), filed Jun. 5, 2007, which is a continuation of U.S. patent application Ser. No. 11/386,238 (now U.S. Pat. No. 7,348,967), filed Mar. 21, 2006, which is a continuation or U.S. patent application Ser. No. 10/188,182 (now U.S. Pat. No. 7,046,230), filed Jul. 1, 2002, which claims benefit of U.S. Provisional Patent Application No. 60/359,551, filed Feb. 25, 2002, which is hereby incorporated by reference in its entirety.

This application is related to U.S. Patent Application No. 60/346,237, filed on Oct. 22, 2001, and which is incorporated herein by reference.

This application is also related to U.S. Design patent application Ser. No. 29/153,169, filed Oct. 22, 2001, and which is incorporated herein by reference.

BACKGROUND OF THE INVENTION

Field of the Invention

The present invention relates generally to a media player having a touch pad. More particularly, the present invention relates to touch pads having scrolling features.

Description of the Related Art

There exist today many styles of input devices for performing operations in a consumer electronic device. The operations generally correspond to moving a cursor and making selections on a display screen. By way of example, the input devices may include buttons, switches, keyboards, mice, trackballs, touch pads, joy sticks, touch screens and the like. Each of these devices has advantages and disadvantages that are taken into account when designing the consumer electronic device. In handheld computing devices, the input devices are generally selected from buttons and switches. Buttons and switches are generally mechanical in nature and provide limited control with regards to the movement of a cursor (or other selector) and making selections. For example, they are generally dedicated to moving the cursor in a specific direction (e.g., arrow keys) or to making specific selections (e.g., enter, delete, number, etc.). In the case of hand-held personal digital assistants (PDA), the input devices tend to utilize touch-sensitive display screens. When using a touch screen, a user makes a selection on the display screen by pointing directly to objects on the screen using a stylus or finger.

In portable computing devices such as laptop computers, the input devices are commonly touch pads. With a touch pad, the movement of an input pointer (i.e., cursor) corresponds to the relative movements of the user's finger (or stylus) as the finger is moved along a surface of the touch pad. Touch pads can also make a selection on the display screen when one or more taps are detected on the surface of the touch pad. In some cases, any portion of the touch pad may be tapped, and in other cases a dedicated portion of the touch pad may be tapped. In stationary devices such as desktop computers, the input devices are generally selected from mice and trackballs. With a mouse, the movement of the input pointer corresponds to the relative movements of the mouse as the user moves the mouse along a surface. With a trackball, the movement of the input pointer corresponds to the relative movements of a ball as the user rotates the ball within a housing. Both mice and trackballs generally include one or more buttons for making selections on the display screen.

In addition to allowing input pointer movements and selections with respect to a GUI presented on a display screen, the input devices may also allow a user to scroll across the display screen in the horizontal or vertical directions. For example, mice may include a scroll wheel that allows a user to simply roll the scroll wheel forward or backward to perform a scroll action. In addition, touch pads may provide dedicated active areas that implement scrolling when the user passes his or her finger linearly across the active area in the x and y directions. Both devices may also implement scrolling via horizontal and vertical scroll bars as part of the GUI. Using this technique, scrolling is implemented by positioning the input pointer over the desired scroll bar, selecting the desired scroll bar, and moving the scroll bar by moving the mouse or finger in the y direction (forwards and backwards) for vertical scrolling or in the x direction (left and right) for horizontal scrolling.

With regards to touch pads, mice and track balls, a Cartesian coordinate system is used to monitor the position of the finger, mouse and ball, respectively, as they are moved. The Cartesian coordinate system is generally defined as a two dimensional coordinate system (x, y) in which the coordinates of a point (e.g., position of finger, mouse or ball) are its distances from two intersecting, often perpendicular straight lines, the distance from each being measured along a straight line parallel to each other. For example, the x, y positions of the mouse, ball and finger may be monitored. The x, y positions are then used to correspondingly locate and move the input pointer on the display screen.

To elaborate further, touch pads generally include one or more sensors for detecting the proximity of the finger thereto. By way of example, the sensors may be based on resistive sensing, surface acoustic wave sensing, pressure sensing (e.g., strain gauge), optical sensing, capacitive sensing and the like. The sensors are generally dispersed about the touch pad with each sensor representing an x, y position. In most cases, the sensors are arranged in a grid of columns and rows. Distinct x and y position signals, which control the x, y movement of a pointer device on the display screen, are thus generated when a finger is moved across the grid of sensors within the touch pad. For brevity sake, the remaining discussion will be held to the discussion of capacitive sensing technologies. It should be noted, however, that the other technologies have similar features.

Capacitive sensing touch pads generally contain several layers of material. For example, the touch pad may include a protective shield, one or more electrode layers and a circuit board. The protective shield typically cavers the electrode layer(s), and the electrode layer(s) is generally disposed on a front side of the circuit board. As is generally well known, the protective shield is the part of the touch pad that is touched by the user to implement cursor movements on a display screen. The electrode layer(s), on the other hand, is used to interpret the x, y position of the user's finger when the user's finger is resting or moving on the protective shield. The electrode layer (s) typically consists of a plurality of electrodes that are positioned in columns and rows so as to form a grid array. The columns and rows are generally based on the Cartesian coordinate system and thus the rows and columns correspond to the x and y directions.

The touch pad may also include sensing electronics for detecting signals associated with the electrodes. For example, the sensing electronics may be adapted to detect the change in capacitance at each of the electrodes as the finger passes over the grid. The sensing electronics are generally located on the backside of the circuit board. By way of example, the sensing electronics may include an application specific integrated circuit (ASIC) that is configured to measure the amount of capacitance in each of the electrodes and to compute the position of finger movement based on the capacitance in each of the electrodes. The ASIC may also be configured to report this information to the computing device.

Referring to FIG. 1, a touch pad 10 will be described in greater detail. The touch pad is generally a small rectangular area that includes a protective shield 12 and a plurality of electrodes 14 disposed underneath the protective shield layer 12. For ease of discussion, a portion of the protective shield layer 12 has been removed to show the electrodes 14. Each of the electrodes 14 represents a different x, y position. In one configuration, as a finger 16 approaches the electrode grid 14, a tiny capacitance forms between the finger 16 and the electrodes 14 proximate the finger 16. The circuit board/sensing electronics measures capacitance and produces an x, y input signal 18 corresponding to the active electrodes 14 is sent to a host device 20 having a display screen 22. The x, y input signal 18 is used to control the movement of a cursor 24 on a display screen 22. As shown, the input pointer moves in a similar x, y direction as the detected x, y finger motion.

SUMMARY OF THE INVENTION

In view of the foregoing, it would be desirable to provide a media player with a touch pad. It would also be desirable to provide a hand held device with a touch pad. It would additionally be desirable to provide a touch pad that can sense and resolve angular and/or radial positions of a moving object (e.g., finger) as it is moved in a rotating and/or radial manner across the touch pad. That is, a touch pad that is based on polar coordinates rather than Cartesian coordinates. It would be further desirable to transform the angular or radial movements into translational movements in the GUI of the display screen for scrolling and other related linear actions.

The invention relates, in one embodiment, to a media player for storing and playing media such as audio, video or images. The media player includes a housing that encloses internally various electrical components that provide computing operations for the media player. The media player also includes a touch pad supported by the housing and configured to provide one or more control functions for controlling various applications associated with the media player.

The invention relates, in another embodiment, to a pocket sized handheld computing device. The computing device includes computing hardware for providing at least one application. The computing device also includes a display screen configured to display text and graphics associated with the at least one application. The computing device additionally includes a touch pad configured to provide one or more control functions for allowing a user of the computing device to provide inputs to the at least one application.

The invention relates, in another embodiment, to a touch pad assembly for use in a computing device. The touch pad assembly has a touch sensitive surface for accepting contact with an object. The touch pad assembly is configured to provide polar coordinate information of the object relative to the touch sensitive surface when the object is moved about the touch sensitive surface.

The invention relates, in another embodiment, to a user input system having a touch pad, a display and a controller. Tue system is configured to convert angular or radial data associated with the touch pad into control inputs associated with the display. By way of example, the control inputs may correspond to translational movements associated with scrolling or other related linear actions.

The invention relates, in another embodiment, to a handheld electronic device for storing and playing media such as audio, video or images. The handheld electronic device includes a memory device configured to store a plurality of media items in a digital format. The handheld electronic device also includes a display configured to present a group of media items from the plurality of stored media items and to present a visual indicator that is capable of scrolling through the displayed group of media items in order to designate a specific media item from the group of media items. The handheld electronic device further includes a touch pad configured to receive input from a sliding motion or a tapping motion of a finger. The sliding motion of the finger controls the movement of the visual indicator through the group of media items. The tapping motion of the finger selects the specific media item that is designated by the visual indicator.

The invention relates, in another embodiment, to a battery powered handheld music player. The battery powered music player includes a housing that supports various electrical components that provide computing operations for the music player. The battery powered music player also includes a memory device disposed inside the housing and configured to store a plurality of songs in a digital format. The battery powered music player further includes a display screen provided at a first portion of a front surface of the housing and configured to present a list of songs from the plurality of stored songs and to present a visual indicator that is capable of linearly traversing through the list of songs in order to designate a specific song from the list of songs. The battery powered music player additionally includes a single integrated input arrangement provided at a second portion of the front surface of the housing. The single integrated input arrangement includes a plurality of input regions that are adjacent one another and that provide control functions for operating the music player. At least one of the input regions being implemented with a touch pad. Moreover, the battery powered music player includes audio output components for outputting music associated with a selected specific song from the list of songs.

The invention relates, in another embodiment, to a battery powered handheld device capable of playing media. The battery powered handheld device includes a housing that supports various electrical components that provide computing operations for the battery powered handheld device. The battery powered handheld device also includes a memory device disposed inside the housing and configured to store a plurality of menu items. The battery powered handheld device further includes a display screen provided at a first portion of a front surface of the housing, and configured to present a list of menu items and to present a visual indicator that is capable of linearly traversing through the list of menu items in order to designate a specific menu item from the list of menu items. The battery powered handheld device additionally includes an input arrangement provided at a second portion of the front surface of the housing. The input arrangement includes an inner input region and one or more outer input regions that provide control functions for operating the battery powered handheld device. The outer input regions are disposed outside the inner input region. The inner input region includes at least a touch pad.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The present invention relates to touch pads. According to one aspect of the invention, a touch pad is provided on a media player to facilitate user interaction therewith. In one embodiment, the media player is a handheld device. According to another aspect of the invention, a touch pad is provided that can sense and resolve angular and/or radial positions of a moving object (e.g., finger) as it is moved in a largely rotational and/or radial manner across the touch pad. In one embodiment, the touch pad that is based on polar coordinates rather than Cartesian coordinates. Other aspects of the invention will become apparent below. In any case, the aspects are not limiting and the various aspects of the invention can be used separately or in combination.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
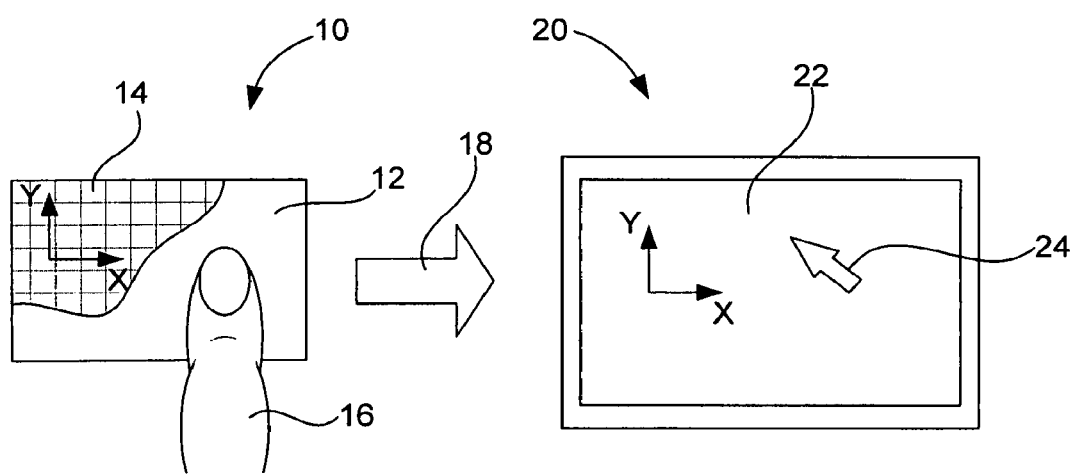
FIG. 1 is a simplified diagram of a touch pad and display.
Figure 2:
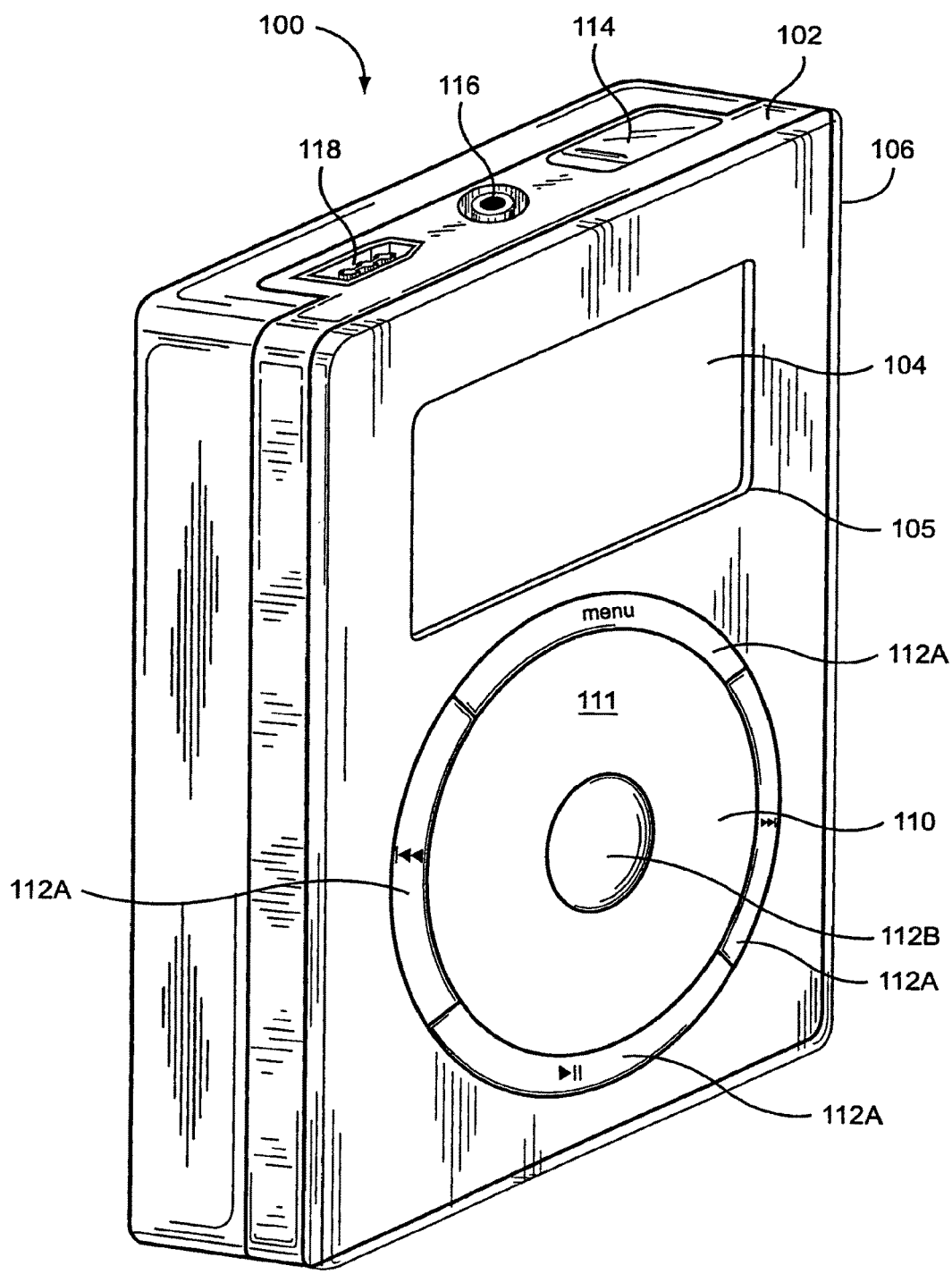
FIG. 2 is a perspective view of a media player, in accordance with one embodiment of the present invention.

FIG. 2 is a perspective diagram of a media player 100, in accordance with one embodiment of the present invention.

The term "media player" generally refers to computing devices that are dedicated to processing media such as audio, video or other images, as for example, music players, game players, video players, video recorders, cameras and the like. These devices are generally portable so as to allow a user to listen to music, play games or video, record video or take pictures wherever the user travels. In one embodiment, the media player is a handheld device that is sized for placement into a pocket of the user. By being pocket sized, the user does not have to directly carry the device and therefore the device can be taken almost anywhere the user travels (e.g., the user is not limited by carrying a large, bulky and often heavy device, as in a portable computer). For example, in the case of a music player, a user may use the device while working out at the gym. In case of a camera, a user may use the device while mountain climbing. Furthermore, the device may be operated by the users hands, no reference surface such as a desktop is needed (this is shown in greater detail in FIG. 3).

Media players generally have connection capabilities that allow a user to upload and download data to and from a host device such as a general purpose computer (e.g., desktop computer, portable computer). For example, in the case of a camera, photo images may be downloaded to the general purpose computer for further processing (e.g., printing). With regards to music players, songs and play lists stored on the general purpose Computer may be downloaded into the music player. In the illustrated embodiment, the media player 100 is a pocket sized hand held MP3 music player that allows a user to store a large collection of music. By way of example, the MP3 music player may store up to 1,000 CD-quality songs.

As shown in FIG. 2, the media player 100 includes a housing 102 that encloses internally various electrical components (including integrated circuit chips and other circuitry) to provide computing operations for the media player 100. Tue integrated circuit chips and other circuitry may include a microprocessor, memory (e.g., ROM, RAM), a power supply (e.g., battery), a circuit board, a hard drive, and various input/output (I/O) support circuitry. In the case of music players, the electrical components may include components for outputting music such as an amplifier and a digital signal processor (DSP). In the case of video recorders or cameras the electrical components may include components for capturing images such as image sensors (e.g., charge coupled device (CCD) or complimentary oxide semiconductor (CMOS)) or optics (e.g., lenses, splitters, filters). In addition to the above, the housing may also define the shape or form of the media player. That is, the contour of the housing 102 may embody the outward physical appearance of the media player 100.

The media player 100 also includes a display screen 104. The display screen 104 is used to display a graphical user interface as well as other information to the user (e.g., text, objects, graphics). By way of example, the display screen 104 may be a liquid crystal display (LCD). In one particular embodiment, the display screen corresponds to a 160-by-128-pixel high-resolution display, with a white LED backlight to give clear visibility in daylight as well as low-light conditions. As shown, the display screen 104 is visible to a user of the media player 100 through an opening 105 in the housing 102, and through a transparent wall 106 that is disposed in front of the opening 105. Although transparent, the transparent wall 106 may be considered part of the housing 102 since it helps to define the shape or form of the media player 100.

The media player 100 also includes a touch pad 110. The touch pad 110 is configured to provide one or more control functions for controlling various applications associated with the media player 100. For example, the touch initiated control function may be used to move an object or perform an action on the display screen 104 or to make selections or issue commands associated with operating the media player 100. In most cases, the touch pad 110 is arranged to receive input from a finger moving across the surface of the touch pad 110 in order to implement the touch initiated control function. The touch pad may be widely varied. For example, the touch pad be a conventional touch pad based on the Cartesian coordinate system, or the touch pad may be a touch pad based on a polar coordinate system (the later will be described in greater detail below).

The manner in which the touch pad 110 receives input may be widely varied. In one embodiment, the touch pad 110 is configured receive input from a linear finger motion. In another embodiment, the touch pad 110 is configured receive input from a rotary or swirling finger motion. In yet another embodiment, the touch pad 110 is configured receive input from a radial finger motion. Additionally or alternatively, the touch pad 110 may be arranged to receive input from a finger tapping on the touch pad 100. By way of example, the tapping finger may initiate a control function for playing a song, opening a menu and the like.

In one embodiment, the control function corresponds to a scrolling feature. For example, in the case of an MP3 player, the moving finger may initiate a control function for scrolling through a song menu displayed on the display screen 104. The term "scrolling" as used herein generally pertains to moving displayed data or images (e.g., text or graphics) across a viewing area on a display screen 104 so that a new set of data (e.g., line of text or graphics) is brought into view in the viewing area. In most cases, once the viewing area is full, each new set of data appears at the edge of the viewing area and all other sets of data move over one position. That is, the new set of data appears for each set of data that moves out of the viewing area. In essence, the scrolling function allows a user to view consecutive sets of data currently outside of the viewing area. The viewing area may be the entire viewing area of the display screen 104 or it may only be a portion of the display screen 104 (e.g., a window frame).

The direction of scrolling may be widely varied. For example, scrolling may be implemented vertically (up or down) or horizontally (left or right). In the case of vertical scrolling, when a user scrolls down, each new set of data appears at the bottom of the viewing area and all other sets of data move up one position. If the viewing area is full, the top set of data moves out of the viewing area. Similarly, when a user scrolls up, each new set of data appears at the top of the viewing area and all other sets of data move down one position. If the viewing area is full, the bottom set of data moves out of the viewing area. In one implementation, the scrolling feature may be used to move a Graphical User Interface (GUI) vertically (up and down), or horizontally (left and right) in order to bring more data into view on a display screen. By way of example, in the case of an MP3 player, the scrolling feature may be used to help browse through songs stored in the MP3 player. The direction that the finger moves may be arranged to control the direction of scrolling. For example, the touch pad may be arranged to move the GUI vertically up when the finger is moved in a first direction and vertically down when the finger is moved in a second direction To elaborate, the display screen 104, during operation, may display a list of media items (e.g., songs). A user of the media player 100 is able to linearly scroll through the list of media items by moving his or her finger across the touch pad 110. As the finger moves around the touch pad 110, the displayed items from the list of media items are varied such that the user is able to effectively scroll through the list of media items. However, since the list of media items can be rather lengthy, the invention provides the ability for the user to rapidly traverse (or scroll) through the list of media items. In effect, the user is able to accelerate their traversal of the list of media items by moving his or her finger at greater speeds.

In one embodiment, the media player 100 via the touch pad 110 is configured to transform a swirling or whirling motion of a finger into translational or linear motion, as in scrolling, on the display screen 104. In this embodiment, the touch pad 110 is configured to determine the angular location, direction, speed and acceleration of the finger when the finger is moved across the top planar surface of the touch pad 110 in a rotating manner, and to transform this information into signals that initiate linear scrolling on the display screen 104. In another embodiment, the media player 100 via the touch pad 110 is configured to transform radial motion of a finger into translational or linear motion, as in scrolling, on the display screen 104. In this embodiment, the touch pad 110 is configured to determine the radial location, direction, speed and acceleration of the finger when the finger is moved across the top planar surface of the touch pad 110 in a radial manner, and to transform this information into signals that initiate linear scrolling on the display screen 104. In another embodiment, the media player 100 via the touch pad 202 is configured to transform both angular and radial motion of a finger into translational or linear motion, as in scrolling, on the display screen 104.

The touch pad generally consists of a touchable outer surface 111 for receiving a finger for manipulation on the touch pad 110. Although not shown in FIG. 2, beneath the touchable outer surface 111 is a sensor arrangement. The sensor arrangement includes a plurality of sensors that are configured to activate as the finger passes over them. In the simplest case, an electrical signal is produced each time the finger passes a sensor. The number of signals in a given time frame may indicate location, direction, speed and acceleration of the finger on the touch pad, i.e., the more signals, the more the user moved his or her finger. In most cases, the signals are monitored by an electronic interface that converts the number, combination and frequency of the signals into location, direction, speed and acceleration information. This information may then be used by the media player 100 to perform the desired control function on the display screen 104.

The position of the touch pad 110 relative to the housing 102 may be widely varied. For example, the touch pad 110 may be placed at any external surface (e.g., top, side, front, or back) of the housing 102 that is accessible to a user during manipulation of the media player 100. In most cases, the touch sensitive surface 111 of the touch pad 110 is completely exposed to the user. In the illustrated embodiment, the touch pad 110 is located in a lower, front area of the housing 102. Furthermore, the touch pad 110 may be recessed below, level with, or extend above the surface of the housing 102. In the illustrated embodiment, the touch sensitive surface 111 of the touch pad 110 is substantially flush with the external surface of the housing 102.

The shape of the touch pad 110 may also be widely varied. For example, the touch pad 110 may be circular, rectangular, triangular, and the like. In general, the outer perimeter of the shaped touch pad defines the working boundary of the touch pad. In the illustrated embodiment, the touch pad 110 is circular. Circular touch pads allow a user to continuously swirl a finger in a free manner, i.e., the finger can be rotated through 360 degrees of rotation without stopping. Furthermore, the user can rotate his or her finger tangentially from all sides thus giving it more range of finger positions. For example, when the media player is being held, a left handed user may choose to use one portion of the touch pad 110 while a right handed user may choose to use another portion of the touch pad 110. More particularly, the touch pad is annular, i.e., shaped like or forming a ring. When annular, the inner and outer perimeter of the shaped touch pad defines the working boundary of the touch pad.

In addition to above, the media player 100 may also include one or more buttons 112. The buttons 112 are configured to provide one or more dedicated control functions for making selections or issuing commands associated with operating the media player 100. By way of example, in the case of an MP3 music player, the button functions may be associated with opening a menu, playing a song, fast forwarding a song, seeking through a menu and the like. In most cases, the button functions are implemented via a mechanical clicking action. Tue position of the buttons 112 relative to the touch pad 110 may be widely varied. For example, they may be adjacent one another or spaced apart. In the illustrated embodiment, the buttons 112 are configured to surround the inner and outer perimeter of the touch pad 110. In this manner, the buttons 112 may provide tangible surfaces that define the outer boundaries of the touch pad 110. As shown, there are four buttons 112A that surround the outer perimeter and one button 112B disposed in the center or middle of the touch pad 110. By way of example, the plurality of buttons 112 may consist of a menu button, play/stop button, forward seek button and a reverse seek button, and the like.

Moreover, the media player 100 may also include a power switch 114, a headphone jack 116 and a data port 118. The power switch 114 is configured to turn the media device 100 on and off. Tue headphone jack 116 is capable of receiving a headphone connector associated with headphones configured for listening to sound being outputted by the media device 100. Tue data port 118 is capable of receiving a data connector/cable assembly configured for transmitting and receiving data to and from a host device such as a general purpose computer. By way of example, the data port 118 may be used to upload or down load songs to and from the media device 100. The data port 118 may be widely varied. For example, the data port may be a PS/2 port, a serial port, a parallel port, a USB port; a Firewire port and the like. In some cases, the data port 118 may be a radio frequency (RF) link or optical infrared (IR) link to eliminate the need for a cable. Although not shown in FIG. 2, the media player 100 may also include a power port that receives a power connector/cable assembly configured for delivering powering to the media player 100. In some cases, the data port 118 may serve as both a data and power port.

Figure 3A:
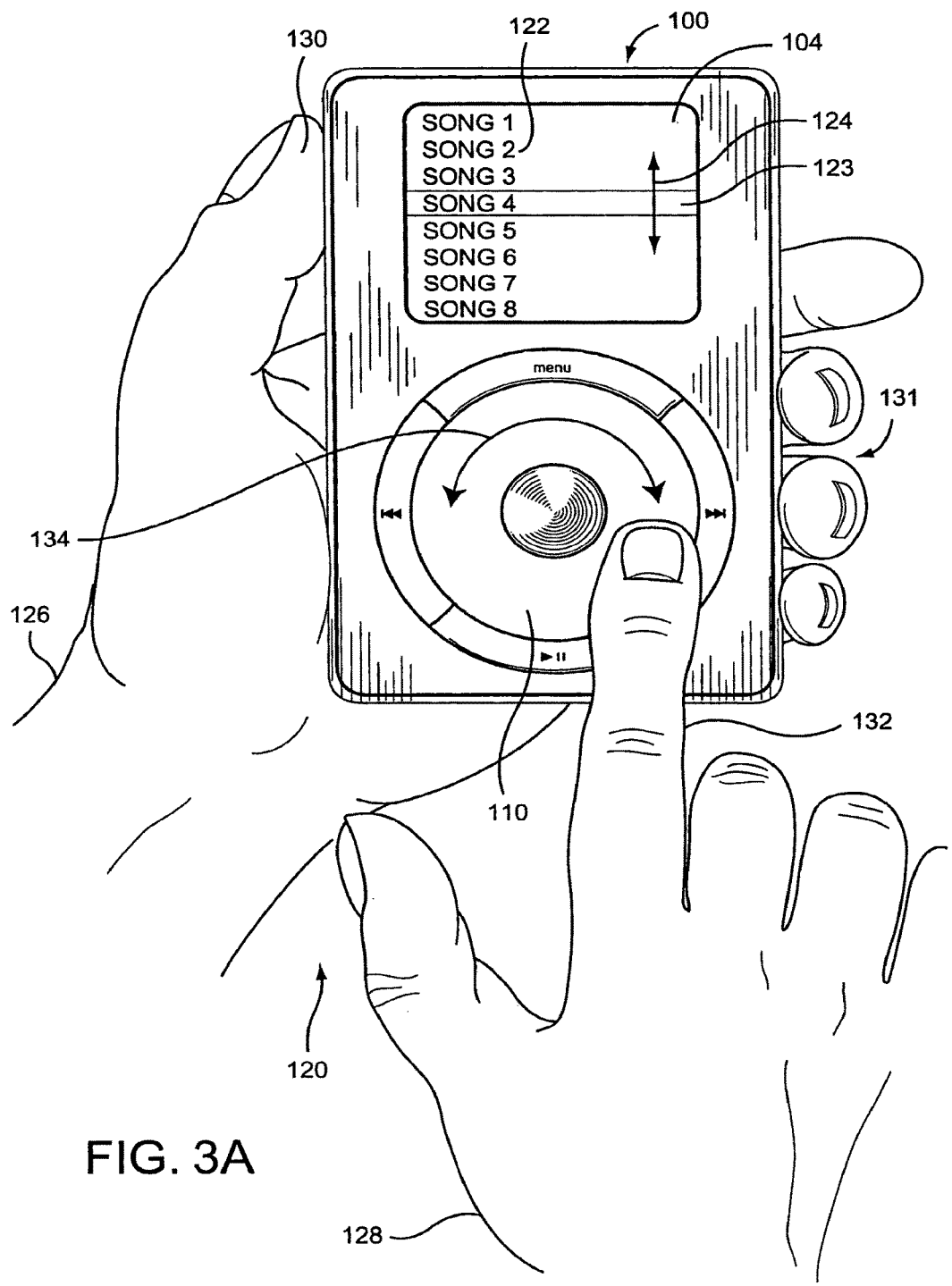
FIGS. 3A-3C are top views of a media player in use, in accordance with one embodiment of the present invention.
Figure 3B:
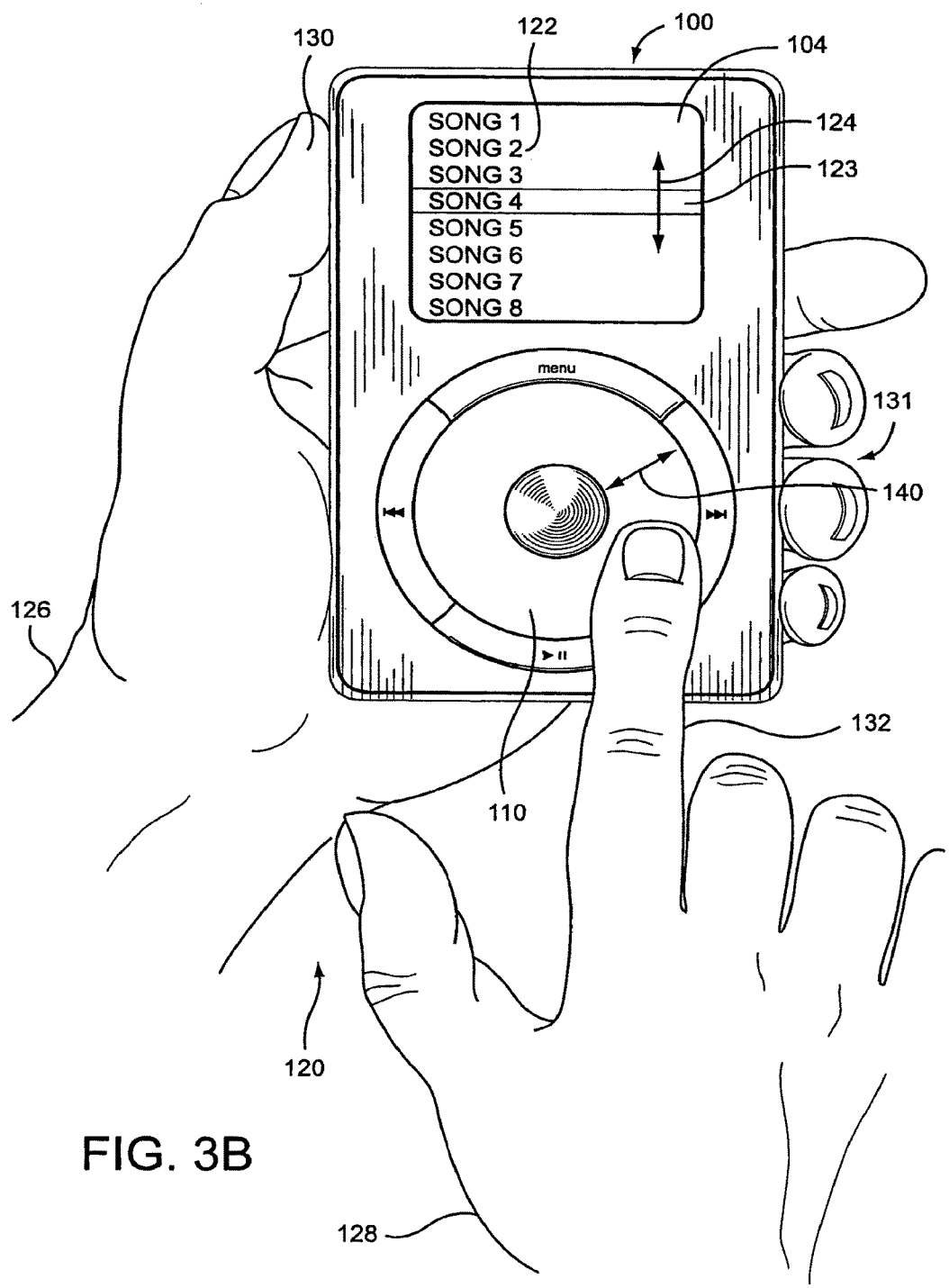
Figure 3C:
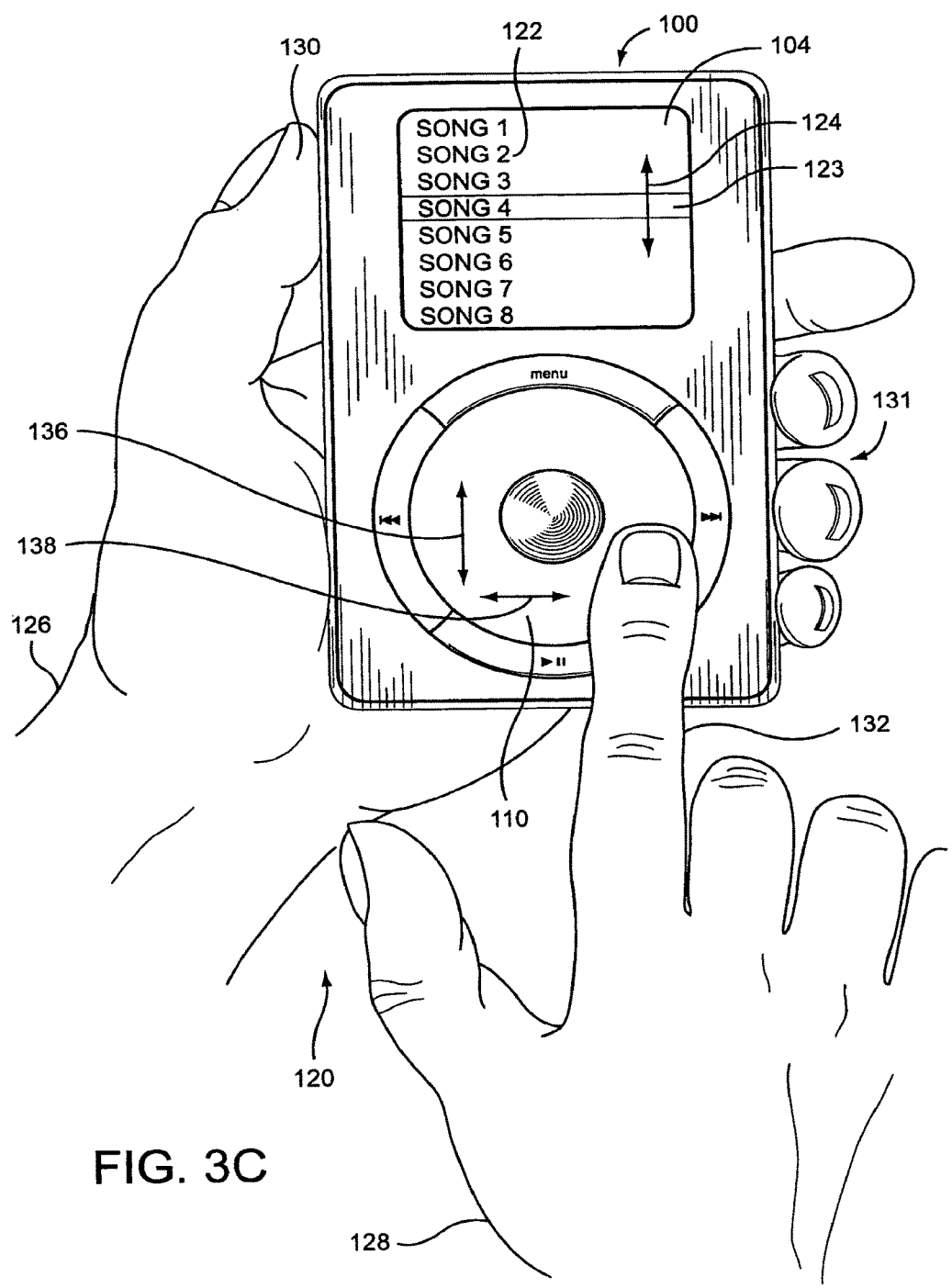

FIGS. 3A-3C show the media player 100 of FIG. 2 being used by a user 120, in accordance with different embodiments of the invention. In all of these embodiments, the user 120 is linearly scrolling 104 (as shown by arrow 124) through a list of songs 122 displayed on the display screen via a slider bar 123. As shown, the media device 100 is comfortably held by one hand 126 while being comfortably addressed by the other hand 128. This configuration generally allows the user 120 to easily actuate the touch pad 110 with one or more fingers. For example, the thumb 130 and rightmost fingers 131 (or leftmost fingers if left handed) of the first hand 126 are used to grip the sides of the media player 100 while a finger 132 of the opposite band 128 is used to activate the touch pad 110. As shown, the entire top surface of the touch pad 110 is accessible to the user's finger 130.

Referring to FIG. 3A, and in accordance with one embodiment of the invention, the touch pad 110 can be continuously actuated by a simple swirling motion of the finger 132 as shown by arrow 134. By swirling, it is meant that the finger moves in an arcuate or circular manner. For example, the finger may rotate relative to an imaginary axis. In particular, the finger can be rotated through 360 degrees of rotation without stopping. This form of motion may produce continuous or incremental scrolling on the display screen 104.

Referring to FIG. 3B, and in accordance with one embodiment of the invention, the user 120 can slide his or her finger 132 radially between the inner and outer perimeter of the touch pad 110. For example, the touch pad 110 may be actuated radially as shown by arrow 140.

Referring to FIG. 3C, and in accordance with one embodiment of the invention, the user 120 can slide his or her finger 132 substantially tangentially from all sides of the touch pad 110. For example, the touch pad 110 may be actuated forwards and backwards as shown by arrows 136 and side to side by arrows 138.

Figure 4:
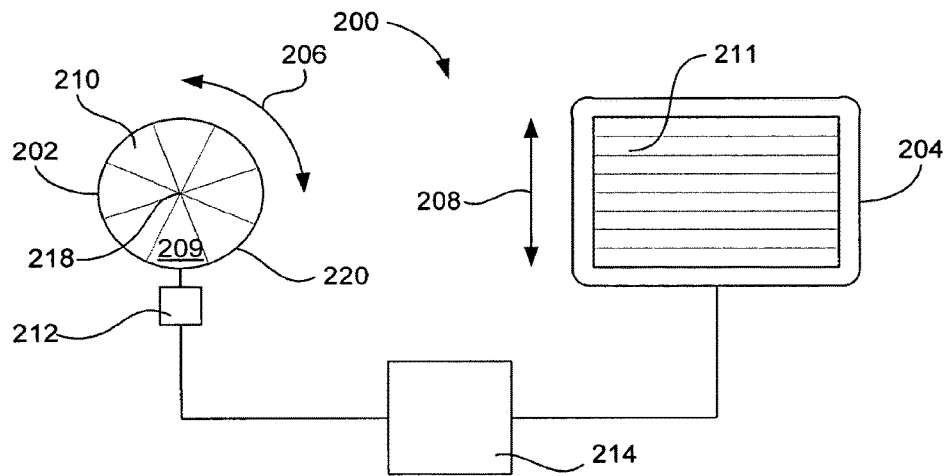
FIG. 4 is a simplified block diagram of a touchpad/display system, in accordance with one embodiment of the present invention.

FIG. 4 is a block diagram of a touchpad/display system 200, in accordance with one embodiment of the invention. By way of example, the touchpad/display system 200 may be used in the media player shown in FIGS. 2 and 3. The touchpad/display system 200 utilizes a touch pad 202 and a display screen 204. The touchpad/display system 200 via the touch pad 202 is configured to transform a swirling or whirling motion 206 of an object such as a finger (as shown in FIG. 3A) into translational or linear motion 208 on the display screen 204. In one embodiment, the touch pad 202 is arranged to continuously determine the angular position of an object relative to the planar surface 209 of the touch pad 202. This allows a user to linearly scroll through a media list 211 on the display screen 204 by swirling the object at least partially around the touch pad 202. For example, by moving the object between any angular positions (e.g., 0-360) on the touch pad 202.

As shown, the touch pad 202 is divided into several independent and spatially distinct zones 210 that are positioned around the periphery of the touch pad 202. Any number of zones may be used. In one embodiment, each of the zones 210 represents a polar angle that specifies the angular position of the zone in the plane of the touch pad 202. By way of example, the zones 210 may be positioned at 2 degree increments all the way around the touch pad 202. Each of the zones 210 has an associated sensor disposed therein for detecting the presence of an object such as a finger. Tue sensors may be widely varied. For example, the sensors may be based on resistive sensing, surface acoustic wave sensing, pressure sensing (e.g., strain gauge, pressure plates, piezoelectric transducers or the like), optical sensing, capacitive sensing and the like. In general, when an object approaches a zone 210, and more particularly a sensor, a position signal is generated that informs the media system 200 that the object is at a specific angular position on the touch pad 202. When an object is moved between zones 210 or over multiple zones 210, multiple position signals are generated. These multiple position signals may be used to determine the angular location, direction, speed and acceleration of the object as its moved around the touch pad 202.

The system 200 also includes a control assembly 212 that is coupled to the touch pad 202. The control assembly 212 is configured to acquire the position signals from the sensors and to supply the acquired signals to a processor 214 of the system. By way of example, the control assembly 212 may include an application specific integrated circuit (ASIC) that is configured to monitor the signals from the sensors, to compute the angular location, direction, speed and acceleration of the monitored signals and to report this information to the processor 214.

The processor 214 is coupled between the control assembly 212 and the display screen 204. The processor 214 is configured to control motion inputs to the display screen 204. In one sequence, the processor 214 receives angular motion information from the control assembly 212 and then determines the next items of the media list 211 that are to be presented on the display screen 204. In making this determination, the processor 214 can take into consideration the length of the media list 211. Typically, the processor 214 will determine the rate of movement of the finger such that the transitioning to different items in the media list 21 1 can be performed faster when the finger is moved at greater speeds. In effect, to the user, the more rapid swirling of the finger enables effective acceleration of the transitioning of the list of media items 211. Alternatively, the control assembly 212 and processor 214 may be combined in some embodiments.

A though not shown, the processor 214 can also control a buzzer to provide audio feedback to a user. The audio feedback can, for example, be a clicking sound produced by the buzzer. In one embodiment, the buzzer 216 is a piezoelectric buzzer. As the rate of transitioning through the list of media items increases, the frequency of the clicking sounds increases. Alternatively, when the rate that the finger is moved slows, the rate of transitioning through the list of media items decreases, and thus the frequency of the clicking sounds correspondingly slows. Hence, the clicking sounds provide audio feedback to the user as to the rate in which the media items within the list of media items are being traversed.

Additionally or alternatively, the system via the touch pad may be configured to transform radial motion an object such as a finger (as shown in FIG. 3B) into translational or linear motion on the display screen. By radial, it is meant that the object moves in a substantially radial direction from the center of the touch pad to an outer perimeter of the touch pad. In one embodiment, the touch pad is arranged to continuously determine the radial position of a finger relative to the planar surface of the touch pad. This allows a user to linearly scroll through a media list on the display screen by moving the object at least partially between the center and outer perimeter of the touch pad. For example, by moving the object between a small and large radius (e.g., 0-3 cm) on the touch pad. This may also allow a user to vary a characteristic of the media player. For example, by moving radially, the user may be able to change the volume of sound being played on the media player (i.e., acts like a potentiometer).

Figure 5:
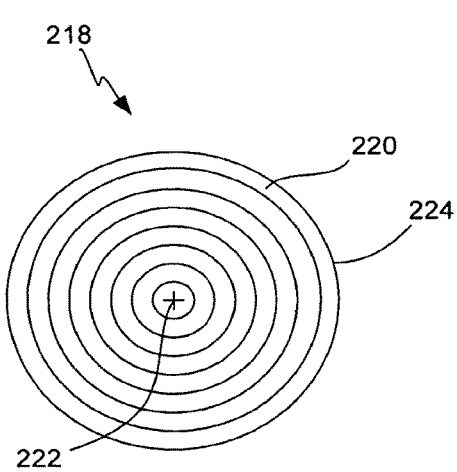
FIG. 5 is a top view of a sensor arrangement of a touch pad, in accordance with another embodiment of the present invention.

Referring to FIG. 5, a radial touch pad 218 will be discussed in accordance with one embodiment. By way of example, the touch pad 218 may replace the touch pad shown in FIG. 4. The touch pad 218 may be divided into several independent and spatially distinct zones 220 that are positioned radially from the center 222 of the touch pad 218 to the perimeter 224 of the touch pad 218. Any number of radial zones may be used. In one embodiment, each of the radial zones 220 represents a radial position in the plane of the touch pad 218. By way of example, the zones 220 may be spaced at 5 mm increments. Like above, each of the zones 220 has an associated sensor disposed therein for detecting the presence of an object such as a finger. In general, when an object approaches a zone 220, and more particularly a sensor, a position signal is generated that informs the system 200 that the object is at a specific radial position on the touch pad 218. When an object is moved between zones 220 or over multiple zones 220, multiple position signals are generated. These multiple position signals may be used to determine radial location, direction, speed and acceleration of the object as its moved radially across the touch pad 218.

Figure 6:
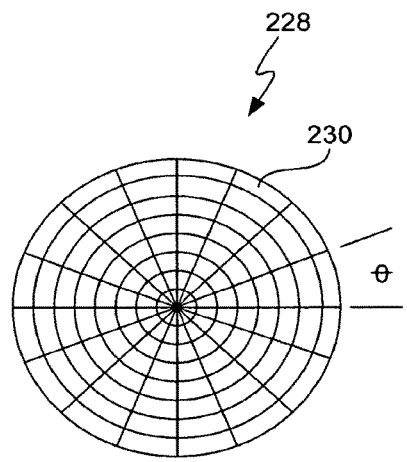
FIG. 6 is a top view of a sensor arrangement of a touch pad, in accordance with another embodiment of the present invention.

Referring to FIG. 6, a combination angular/radial touch pad 228 will be discussed in accordance with one embodiment. By way of example, the touch pad 228 may replace the touch pad shown in FIG. 4. The touch pad 228 may be divided into several independent and spatially distinct zones 230 that are positioned both angularly and radially about the periphery of the touch pad 228 and from the center of the touch pad 202 to the perimeter of the touch pad 228. Any number of combination zones may be used. In one embodiment, each of the combination zones 230 represents both an angular and radial position in the plane of the touch pad 228. By way of example, the zones may be positioned at both 2 degrees and 5 mm increments. Like above, each of the combination zones 230 has an associated sensor disposed therein for detecting the presence of an object such as a finger. In general, when an object approaches a combination zone 230, and more particularly a sensor, a position signal is generated that informs the system 200 that the object is at a specific angular and radial position on the touch pad 228. When an object is moved between combination zones 230 or over multiple combinations zones 230, multiple position signals are generated. These multiple position signals may be used to determine location, direction, speed and acceleration of the object as its angularly and radially moved across the touch pad 228. The angular and radial zones may be initiated at the same time or they may be initiated at different times. For example, the angular zones may be initiated for scrolling through a media player and the radial zones may be initiated for varying the volume of a media player.

It should be noted that although the touch pads of FIGS. 4-6 are all shown as circular that they may take on other forms such as other curvilinear shapes (e.g., oval, annular and the like), rectilinear shapes (e.g., hexagon, pentagon, octagon, rectangle, square, and the like) or a combination of curvilinear and rectilinear (e.g., dome).

Figure 7:
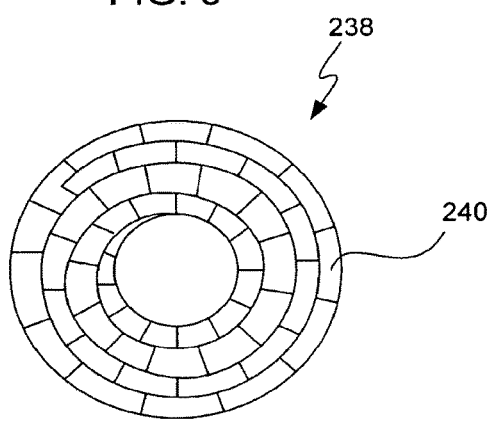
FIG. 7 is a top view of a sensor arrangement of a touch pad, in accordance with another embodiment of the present invention.

Furthermore, in order to provide higher resolution, a more complex arrangement of zones may be used. For example, as shown in FIG. 7, the touch pad 238 may include angular and radial zones 240 that are broken up such that consecutive zones do not coincide exactly. In this embodiment, the touch pad 202 has an annular shape and the zones 240 follow a spiral path around the touch pad 202 from the center to the outer perimeter of the touch pad 202.

Figure 8:
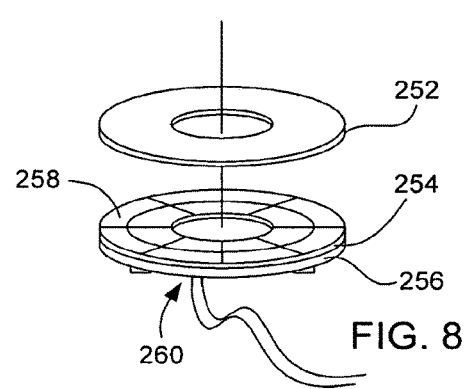
FIG. 8 is a partially broken away perspective view of an annular capacitive touch pad, in accordance with one embodiment of the present invention.

FIG. 8 is a partially broken away perspective view of an annular capacitive touch pad 250, in accordance with one embodiment of the present invention. By way of example, the annular capacitive touch pad 250 may correspond to the touch pad of FIG. 2. The annular capacitive touch pad 250 is arranged to detect changes in capacitance as the user swirls an object such as a finger around the touch pad 250. The annular capacitive touch pad 250 is also arranged to detect changes in capacitance as the user moves their finger radially across the touch pad 250. The annular capacitive touch pad 250 is formed from various layers including at least a label layer 252, an electrode layer 254 and a circuit board 256. The label layer 252 is disposed over the electrode layer 254 and the electrode layer 254 is disposed over the circuit board 256. At least the label 252 and electrode layer 254 are annular such that they are defined by concentric circles, i.e., they have an inner perimeter and an outer perimeter. The circuit board 256 is generally a circular piece having an outer perimeter that coincides with the outer perimeter of the label 252 and electrode layer 254. It should be noted, however, that in some cases the circuit board 256 may be annular or the label 252 and electrode layer 254 may be circular.

The label layer 252 serves to protect the underlayers and to provide a surface for allowing a finger to slide thereon. The surface is generally smooth so that the finger does not stick to it when moved. The label layer 252 also provides an insulating layer between the finger and the electrode layer 254. The electrode layer 254 includes a plurality of spatially distinct electrodes 258 that have positions based on the polar coordinate system. For instance, the electrodes 258 are positioned both angularly and radially on the circuit board 256 such that each of the electrodes 258 defines a distinct angular and radial position thereon. Any suitable number of electrodes 258 may be used. In most cases, it would be desirable to increase the number of electrodes 258 so as to provide higher resolution, i.e., more information can be used for things such as acceleration.

When configured together, the touch pad 250 provides a touch sensitive surface that works according to the principals of capacitance. As should be appreciated, whenever two electrically conductive members come close to one another without actually touching, their electric fields interact to form capacitance. In this configuration, the first electrically conductive member is one or more of the electrodes 258 and the second electrically conductive member is the finger of the user. Accordingly, as the finger approaches the touch pad 250, a tiny capacitance forms between the finger and the electrodes 258 in close proximity to the finger. The capacitance in each of the electrodes 258 is measured by control circuitry 260 located on the backside of the circuit board 256. By detecting changes in capacitance at each of the electrodes 258, the control circuitry 260 can determine the angular location, direction, speed and acceleration of the finger as it is moved across the touch pad 250. The control circuitry 260 can also report this information in a form that can be used by a computing device. By way of example, the control circuitry may include an ASIC (application specific integrated circuit).

Figure 9:
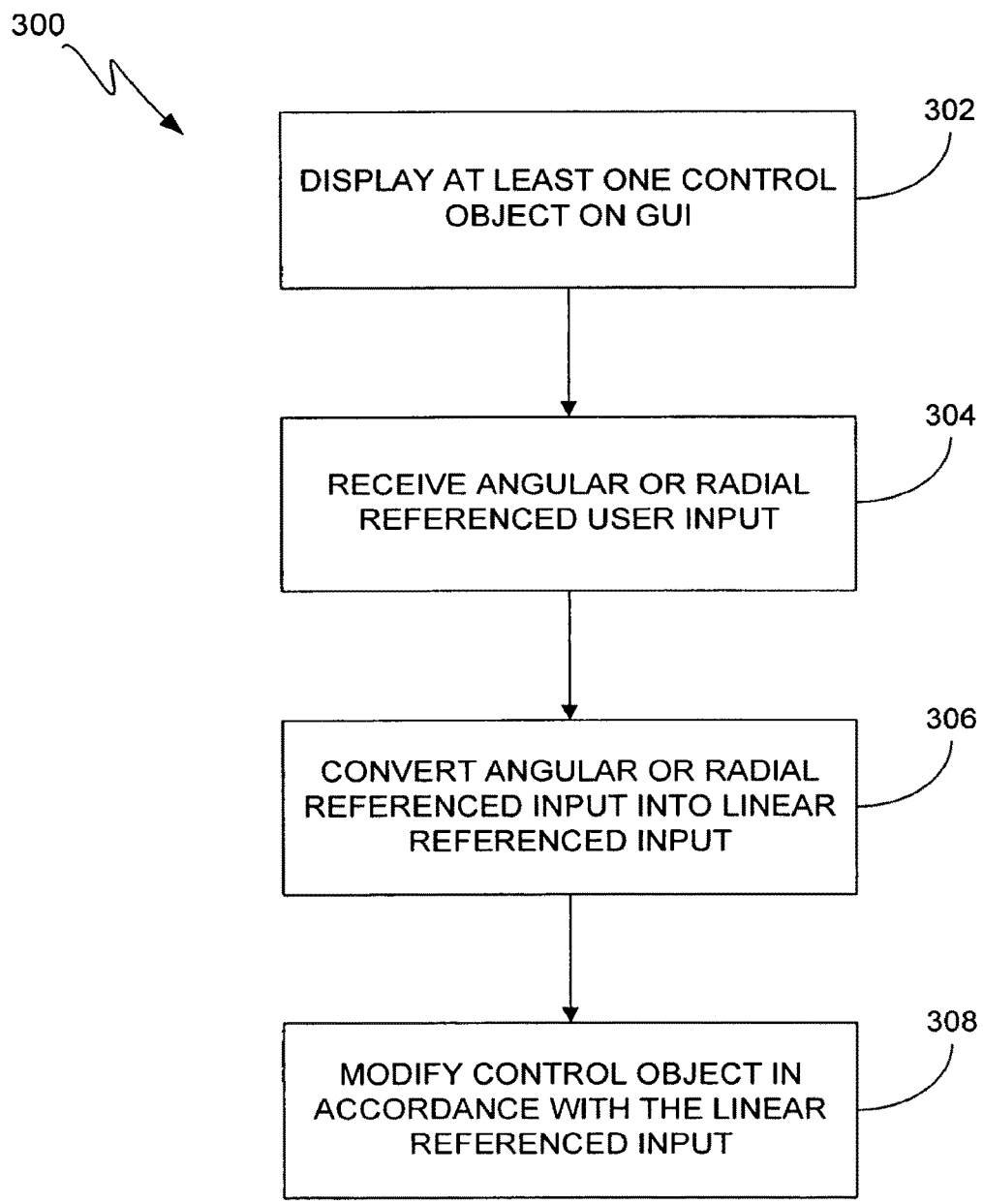
FIG. 9 is a flow diagram of touch pad-display processing, in accordance with one embodiment of the invention.

FIG. 9 is a flow diagram of touch pad-display processing 300, in accordance with one embodiment of the invention. The touch pad-display processing 300 allows a user to interact with a graphical user interface of a computing device. The touch pad-display processing 300 generally begins at block 302 where at least one control object is displayed on the graphical user interface. By way of example, the control object may be a slider bar that highlights information from a list in a menu displayed on a graphical user interface on a display screen. The displayed control object is generally controlled by the processor 214 illustrated in FIG. 3. Following block 302, the touch pad-display processing proceeds to block 304 where a user input is received. The user input may be received by the processor 214 illustrated in FIG. 3. In one embodiment, the user input is an angular referenced input, as for example, a user input produced by a rotational user action such as a finger swirling across the touch pad. By way of example, the touch pad may correspond to the touch pad illustrated in FIG. 3. In another embodiment, the user input is a radial referenced input, as for example, a user input produced by a radial user action such as a finger radially moving across the touch pad. By way of example, the touch pad may correspond to the touch pad illustrated in FIG. 4.

Following block 304, the touch pad-display processing proceeds to block 306 where the angular or radial referenced user input is converted into a linear referenced input. The conversion may be implemented by the processor 212 illustrated in FIG. 3. Following block 306, the touch pad-display processing proceeds to block 308 where control object is modified in accordance with the linear referenced input. For example, the control object such as a slider bar may be linearly moved from a first item to a second item on a list or it may be moved through multiple items on a list (e.g., scrolling). The modification is generally implemented when the processor 214 illustrated in FIG. 3 supplies the linear referenced input to the graphical user interface on the display screen.

The various aspects of the invention described above can be used alone or in various combinations. The invention is preferably implemented by a combination of hardware and software, but can also be implemented in hardware or software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over a network coupled computer systems so that the computer readable code is stored and executed in a distributed fashion.

Furthermore, although a scrolling feature is described, it should be noted that a scrolling feature is not a limitation and that the touch pad may be used to manipulate other features. For example, the touch pad may be used to adjust a volume control in an audio application. In addition, the touch pad may be used to advance through frames in a movie in video editing applications. The touch pad may also be used in video game applications.

The advantages of the invention are numerous. Different embodiments or implementations may yield one or more of the following advantages. It should be noted that this is not an exhaustive list and there may be other advantages which are not described herein. One advantage of the invention is that a user is able to easily and rapidly traverse a lengthy list of media items. Another advantage of the invention is that a substantial portion of the touch pad is accessible to the user, i.e., the touch pad provides a large surface area for manipulation thereof. Another advantage of the invention is that the touch pad can be continuously actuated by a simple swirling motion of a finger, i.e., the finger can be rotated through 360 degrees of rotation without stopping. Another advantage of the invention is that the touch pad provides more range of finger positions. For example, a left handed user may choose to use one portion of the touch pad while a right handed user may choose to use another portion of the touch pad. In essence, the touch pad is more ergonomic. Another advantage of the invention is that the touch pad makes the media player more aesthetically pleasing. Another advantage of the invention is that the touch pad allows an intuitive way to scroll on a display screen. For example, the user can manipulate the his or her finger side to side for horizontal scrolling and the user can manipulate his or her finger backwards and forwards for vertical scrolling.

While this invention has been described in terms of several preferred embodiments, there are alterations, permutations, and equivalents, which fall within the scope of this invention. For example, although the invention has been described in terms of an MP3 music player, it should be appreciated that certain features of the invention may also be applied to other types of media players such as video recorders, cameras, and the like. Furthermore, the MP3 music player described herein is not limited to the MP3 music format. Other audio formats such as MP3 VBR (variable bit rate), AIFF and WAV formats may be used. Moreover, certain aspects of the invention are not limited to handheld devices. For example, the touch pad may also be used in other computing devices such as a portable computer, personal digital assistants (PDA), cellular phones, and the like. The touch pad may also be used a stand alone input device that connects to a desktop or portable computer. It should also be noted that there are many alternative ways of implementing the methods and apparatuses of the present invention. For example, although the touch pad has been described in terms of being actuated by a finger, it should be noted that other objects may be used to actuate it in some cases. For example, a stylus or other object may be used in some configurations of the touch pad. It is therefore intended that the following appended claims be interpreted as including all such alterations, permutations, and equivalents as fall within the true spirit and scope of the present invention.

The invention claimed is:

1. A portable electronic device, comprising:
a movable circular ring, the movable circular ring coupled to one or more movement detection sensors such that movement of the movable circular ring enables generation of one or more first input signals;
a central touch sensitive area enclosed by the movable circular ring and configured such that a touch on the central touch sensitive area enables generation of one or more second input signals; and
an annular area between the movable circular ring and the central touch sensitive area, the annular area having a touch-sensitive outer surface coupled to a plurality of sensors and configured such that contact of an object with the touch-sensitive outer surface enables generation of one or more third input signals;
wherein at least one of multiple device functions is enabled by at least one of the one or more first input signal, the one or more second input signals, and the one or more third input signals.

2. The portable electronic device of claim 1, wherein one of the one or more third input signals corresponds to at least one of a location, a direction, a speed, and an acceleration of the object on the touch-sensitive outer surface.

3. The portable electronic device of claim 1, further comprising a display with a plurality of items, the device capable of scrolling through the plurality of items based on at least one of the one or more first input signals or at least one of the one or more third input signals.

4. The portable electronic device of claim 1, wherein one of the one or more third input signals corresponds to linear object motion across the annular area between the movable circular ring and the central touch sensitive area.

5. The portable electronic device of claim 1, wherein one of the one or more third input signals corresponds to circular object motion across the annular area between the movable circular ring and the central touch sensitive area.

6. A wearable computing device comprising the portable electronic device of claim 1.

7. A method for enabling a device function, comprising:
generating movement of a movable circular ring;
detecting the movement from one or more movement detection sensors operatively coupled to the movable circular ring;
providing a central touch sensitive area enclosed by the movable circular ring and an annular area between the movable circular ring and the central touch sensitive area;
detecting a touch on the central touch sensitive area, or detecting an application of touch on one or more touch sensitive regions from a plurality of sensors operatively coupled to a touch-sensitive outer surface of the annular area;
interpreting at least one of the movement of the movable circular ring and the detected touch on the central touch-sensitive outer region or the detected touch from the plurality of sensors to determine at least one of multiple device functions to be performed.

8. The method of claim 7, wherein the applied touch corresponds to at least one of a location, a direction, a speed, and an acceleration of the applied touch on the touch-sensitive outer surface.

9. The method of claim 7, wherein one of the multiple device functions to be performed comprises:
scrolling through a plurality of items displayed on a display.

10. The method of claim 7, wherein the applied touch corresponds to linear motion across the annular area between the movable circular ring and the central touch sensitive area.

11. The method of claim 7, wherein the applied touch corresponds to circular motion across the annular area between the movable circular ring and the central touch sensitive area.

12. A portable electronic device, comprising:
movable circular input means coupled to one or more movement detection sensors and configured for generating one or more first input signals upon movement of the movable circular input means;
central touch sensitive means enclosed by the movable circular input means such that a touch on the central touch sensitive means enables generation of one or more second input signals; and
annular touch-sensitive outer surface means between the movable circular input means and the central touch sensitive means, the annular touch-sensitive outer surface means coupled to a plurality of sensors and configured such that contact of an object with the annular touch-sensitive outer surface means enables generation of one or more third input signals
wherein at least one of multiple device functions is enabled by at least one of the one or more first input signals, the one or more second input signals, and the one or more third input signals.

13. The portable electronic device of claim 12, wherein one of the one or more third input signals corresponds to at least one of a location, a direction, a speed, and an acceleration of the object on the annular touch-sensitive outer surface means.

14. The portable electronic device of claim 12, further comprising:
display means configured to display a plurality of items, the device capable of scrolling through the plurality of items based on at least one of the one or more first input signals or at least one of the one or more third input signals.

15. The portable electronic device of claim 12, wherein one of the one or more third input signals corresponds to linear object motion across the annular touch-sensitive outer surface means between the movable circular input means and the central touch sensitive means.

16. The portable electronic device of claim 12, wherein one of the one or more third input signals corresponds to circular object motion across the annular touch-sensitive outer surface means between the movable circular input means and the central touch sensitive means.

* * * * *